United States Patent
Berneth et al.

(10) Patent No.: US 6,344,918 B1
(45) Date of Patent: Feb. 5, 2002

(54) ELECTROCHROMIC CONTRAST-PLATE

(75) Inventors: Horst Berneth, Leverkusen; Wolfgang Jacobsen, Köln; Serguei Kostromine, Swisttal; Ralf Neigl, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/291,834

(22) Filed: Apr. 14, 1999

(30) Foreign Application Priority Data

Mar. 29, 1999 (DE) .......................... 199 14 304

(51) Int. Cl.$^7$ .......................... G02F 1/15; G02F 1/153

(52) U.S. Cl. .......................... 359/265; 359/268; 359/272; 359/273

(58) Field of Search ................................ 359/265–275

(56) References Cited

U.S. PATENT DOCUMENTS

| | | | |
|---|---|---|---|
| 4,902,108 A | 2/1990 | Byker | 359/265 |
| 5,128,267 A | 7/1992 | Köcher et al. | 436/92 |
| 5,847,858 A | 12/1998 | Krings et al. | 359/265 |

FOREIGN PATENT DOCUMENTS

| | | |
|---|---|---|
| DE | 3917323 | 11/1990 |
| DE | 4435211 | 4/1995 |
| DE | 196 05 448 | 2/1997 |
| EP | 0 476 457 | 3/1992 |
| EP | 0 476 456 | 8/1992 |
| WO | 97/30134 | 8/1997 |
| WO | 98/44384 | 10/1998 |

OTHER PUBLICATIONS

Topics in Current Chemistry, vol. 92, S. pp. 1–44 (month unavailable) 1980, Siegfried Hünig and Horst Berneth, Two Step Reversible Redox Systems of the Weitz Type.

Angew Chem. 90, pp. 927–939, Jan. 1978, Van Klaus Deucher und Siegfried Hünig, Mehrstufige organische Redoxsysteme ein allgemeines Strukturprinzip.

(List continued on next page.)

*Primary Examiner*—Evelyn A Lester
(74) *Attorney, Agent, or Firm*—Joseph C. Gil; Richard E. L. Henderson; Diderico van Eyl

(57) ABSTRACT

The invention relates to an electrochromic contrast plate which is either arranged as a discrete unit in front of the screen or is connected to the outer surface of the screen through a common sheet, consisting of a pair of transparent glass or plastic sheets which are provided, on one side each, with an electroconductive, transparent coating, and which are joined together on the sides of their conductive coating via a sealing ring, and in which the volume formed by the two sheets and the sealing ring is filled with an electrochronic medium, characterized in that the electrochromic medium is a liquid, a gel or a polymer. The invention furthermore relates to an electrochromic contrast plate with integrated touch screen which has a larger base area than the area of the screen, and, at at least one of the faces of the outer sheet (outer plate) of the electrochromic contrast plate, a radiation source is arranged whose light enters the outer plate and illuminates it, and, at the inner sheet (carrier plate), in the region which projects beyond the screen area, a photodetector is mounted in whose photosensitive solid-angle region part or all of the carrier plate is located, if it projects beyond the screen area. The invention furthermore relates to electrochromic side-chain oligomers or polymers which can be used as electrochromic media.

22 Claims, 2 Drawing Sheets

OTHER PUBLICATIONS

Adv. Mater. 3, (month unavailable) 1991, pp. 225–236, Siegfried Hünig and Peter Erk OCNQIs–New Electron Acceptors for Charge–Transfer Complexes and Highly Conducting Radical Anion Salts.

J. Am. Chem. Soc., 117 (month unavailable) 1995, pp. 8528–8535, Gregory V. Tomomos, Martin G. Bakker, Ping Wang, M.V. Lakshmikantham, Michael P. Cava and Robert M. Metzger, Dithiadiazafulvalenes–New Strong Electron Donor. Synthesis, Isolation, Properties, and EPR Studies.

J. Chem. Soc. Perkin II, (month unavailable) 1990, pp. 1777–1783, Martin R. Bryce et al, Synthesis and Redox Behaviour of Highly Conjugated Bis(benzo–1,3–dithiole) and Bis(benzothiazole) Systems containing Aromatic Linking Groups: Model Systems for Organic Metals.

J. Org. Chem. (month unavailable) 1992, 57, pp. 1849–1855, Gerard A. Grispino et al Synthesis of Tripyridiniumylpropenyl Anions from Tripyridiniumlcylopropanes and cyclopropenes.

J. of Am. Chem. Soc. 99, Aug. 31, 1977, pp. 6120–6122, Michael Horner & Siegfried Hünig, Bicyclo[1.1.0]butanes. A New Synthetic Route and Valance Isomerizations.

David A. Glocker, Ismat Sha (Ed.) Handbook of Thin Film Process Technologie, Institute of Physics Publishing, Bristol and Philadelphia (month unavailable) 1995.

Colour physics for Industry, Roderick McDonald, ed., Society of Dyers and Colourists. (month unavailable) 1987, pgs v to xi, Dyers' Compman Publications Trust.

ELECTROCHROMIC CONTRAST-PLATE

The present invention relates to an electrochronic (EC) contrast plate for display screens whose transmission in the optically visible region can be controlled by applying a voltage. The invention furthermore relates to an EC contrast plate having an integrated touch screen. The invention also relates to electrochromic side-chain oligomers and polymers which can be used as electrochromic media.

In display screens which are operated, in particular, in daylight, the image contrast is frequently lost due to reflection of ambient light on the screen. In the extreme case, the image is virtually impossible to see. This applies in particular to display screens based on a cathode ray tube (CRT) or on a liquid-crystal display (LCD).

U.S. Pat. No. 5,847,858 (WO 97/22906) proposes arranging an additional, colour-neutral filter in front of the screen. This colour-neutral filter is an electrochromic device which functions on the basis of two different types of metal oxides. The first electrode is treated with a mixture of one or more metal oxides from group 1, consisting of $WO_3$, $MoO_3$, $Nb_2O_5$, $MnO_2$ and $ZrO_2$, and group 2, consisting of $V_2O_5$, $TiO_2$ and ZnO. The counterelectrode does not contribute towards modifying the transmission of the EC device. If this colour-neutral filter is arranged in front of a display screen, such as, for example, a cathode ray tube (CRT), it reduces the intensity of the reflected ambient light and also of the internal light source, such as, for example, the phosphors of the CRT. The incident ambient light passes through the colour-neutral filter and is reflected at the screen surface. The reflected light again passes through the absorbent colour-neutral filter before exiting. For a transmission T of the colour-neutral filter, this gives an attenuation by the factor $T^2$. Light originating from an internal light source, such as the light from the phosphors, need only pass through the colour-neutral filter once and is thus only attentuated by a factor T. The contrast is thus increased by a factor $T^{-1}$. This colour-neutral filter is produced by a very complex, expensive sputtering process. In addition, electrochromic coloured filters of this type are not particularly resistant and do not allow a large number of switching cycles. Coloured filters based on tungsten oxide/palladium hydride exhibit light scattering and consequently a distortion of the picture and a decrease in contrast.

Display screens are increasingly being used in aggressive environments, such as, for example, in production operations for process control. The input devices used for computers and electronic measurement and control equipment, in particular in production operations and similar environments, in which conventional computer input devices, such as a mouse or keyboard, wear very quickly owing to the considerable dust and dirt loading, are predominantly touch screens. The image displayed on the touch screens usually consists of some explanatory texts and a series of fields, the touching of which corresponds to a certain data or command input.

Known touch screens are constructed, for example, from liquid-crystal displays or cathode ray tubes and an additional touch-sensitive device.

The disadvantage of the known touch screens is firstly that they rapidly become dirty (systems with light barriers) or age rapidly (system with touch-sensitive membranes).

The object according to the invention consists in providing a device for improving the contrast of display screens, while retaining colour neutrality, which is less complex to produce than the colour-neutral filters known from the prior art. The device according to the invention should have a large electrochromic range, be ageing-resistant and allow a very large number of switching cycles. A further object of the invention is simultaneously to provide a robust, easy-to-clean touch screen with the device for improving the contrast.

The object according to the invention is achieved by an EC contrast plate. The EC contrast plate consists of an electrochromic device known per se, comprising a pair of glass or plastic sheets which are provided on one side each with an electroconductive coating, for example indium-tin oxide (ITO). Both sheets are transparent. These sheets are used to construct a cell by connecting them, preferably adhesively bonding them, to an annular or rectangular sealing ring with their electroconductively coated sides facing one another. The sealing ring establishes a uniform distance between the sheets, of, for example, from 0.01 to 0.5 mm. This cell is filled with an electrochromic medium. The two sheets can be provided with separate contacts via the electroconductive layers.

This EC contrast plate is in accordance with the invention either arranged as a discrete unit in front of the display screen or connected to the outer surface of the screen as one substrate through a common sheet The EC contrast plate according to the invention contains an EC medium which is a solution or a gel or a polymer. A medium of this type can easily be introduced into an electrochromic cell.

The EC medium comprises a mixture of electrochromic compounds which, on application of a voltage, produces a very uniform, neutral grey coloration or causes any desired other coloration, such as, for example, a red coloration of the image. The transmission of the electrochromic layer in the visible region can be varied by varying the strength of an applied voltage.

A preferred embodiment of the invention is determined by the colour coordinates (x,y) of the dyes in the EC medium, which, in accordance with the C.I.E. standard (regarding the C.I.E. standard, see, for example, Colour Physics in Industry, Roderick McDonald, ed., Society of Dyers and Colourists, 1987), are in the colour triangle between 0.3 and 0.37 or preferably between 0.31 and 0.35.

In a further, likewise preferred embodiment of the invention, the colour coordinates of the EC medium in the switched state are in basically any desired region of colour space, this region being determined by the particular requirements of the application, for example the exclusion of certain wavelength ranges on use in photographic development laboratories.

If no voltage is applied between the two electroconductive layers, the EC contrast plate is transparent and preferably has a transmission of greater than 70%. The minimum transmission in the case of colouring is less than 25%. The transmission remains constant over the entire area, even in the case of curved surfaces, and varies by less than 5% in time and space.

The switching times in which colouring or decolouring occurs after application of a voltage or after switching-off of the voltage respectively are less than 5 minutes, preferably less than one minute.

As electrochromic medium, DE 196 05 451 and DE 196 05 448 disclose electrochromic systems, which usually contain pairs of redox substances dissolved in an inert solvent. In addition, conductive salts, light stabilizers (UV stabilizers) and substances which modify the viscosity-may be present. The pair of redox substances used comprises one reducible substance and one oxidizable substance. In the ground state, the two substances are colourless or only weakly coloured. Under the influence of an electric voltage, the first substance is reduced and the other oxidized, at least one becoming coloured. When the voltage is switched off, the ground state is restored in both substances, with decoloration or colour lightening occurring.

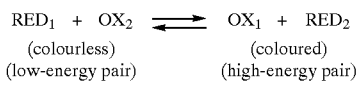

U.S. Pat. No. 4,902,108 discloses that suitable pairs of redox substances are those whose reducible substance has at least two chemically reversible reduction waves in the cyclic voltammogram and whose oxidizable substance correspondingly has at least two chemically reversible oxidation waves.

The electrochromic systems from DE 196 05 448 and DE 196 05 451 comprise at least one oxidizable substance $RED_1$, and at least one reducible substance $OX_2$, which, respectively through electron donation at an anode and electron acceptance at the cathode, are converted from a weakly coloured or colourless form into a coloured form $OX_1$ and $RED_2$ respectively, in each case with an increase in the absorbance in the visible region of the spectrum, where the weakly coloured or colourless form is re-formed in each case after charge equalization and, in at least one of the resultant substances $RED_1$ or $OX_2$, the mutual conversion of oxidized and reduced form takes place through breaking or formation of a σ-bond (DE 196 05 448) or at least one of the resultant substances $RED_1$ and $OX_2$ are linked covalently to one another via a bridge.

The cell according to the invention preferably contains electrochromic media in which a) the reducible substance has at least one, preferably at least two, chemically reversible reduction waves in the cyclic voltammogram and the oxidizable substance correspondingly has at least one, preferably at least two, chemically reversible oxidation waves, or b) the reducible substance and the oxidizable substance are covalently bonded to one another via a bridge B, or c) the reducible and/or oxidizable substance selected are those in which the reversible transition between the oxidizable form and the reducible form or vice versa is associated with the breaking or formation of a σ-bond, or d) the reducible substance and/or the oxidizable substance are metal salts or metal complexes of metals which exist in at least two oxidation states, or e) the reducible and/or oxidizable substance are oligomers and polymers which contain at least one of said redox systems, or alternatively pairs of such redox systems, as defined under a) to d), or f) the reducible and/or oxidizable substance employed are mixtures of the substances described in a) to e), provided these mixtures comprise at least one reducible and at least one oxidizable redox system.

Through selection of the electrochromic compounds $RED_1$ and $OX_2$ and/or mixtures thereof, any desired hues can be established. The preferred grey shades can be established in a known manner through suitable mixing of trichromatic colours (Colour Physics for Industry, Roderick McDonald, ed., Society of Dyers and Colourists, 1987 and WO 98/44384).

$OX_2$ and $RED_1$ which are suitable for the purposes of the invention are substances which, on reduction or oxidation at the cathode or anode respectively in said solvent, give products $RED_2$ and $OX_1$ which do not undergo any secondary chemical reaction, but instead can be fully oxidized or reduced back into $OX_2$ and $RED_1$.

Suitable reducible substances $OX_2$ are, for example:

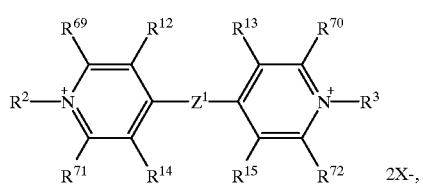

(I)

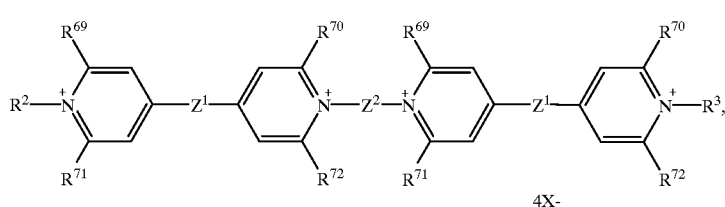

(II)

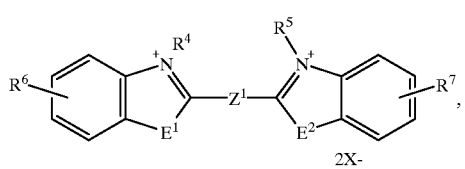

(III)

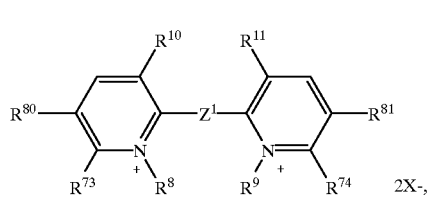

(IV)

-continued (V)
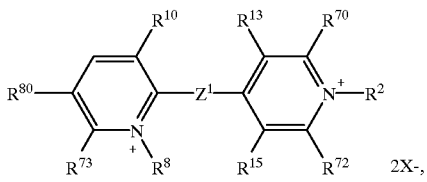

(VI)
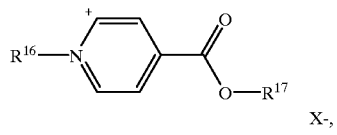
X-, (VII)
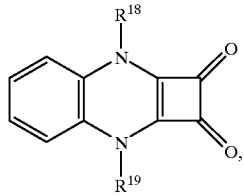

(VIII)
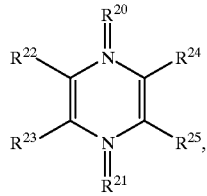

(IX)
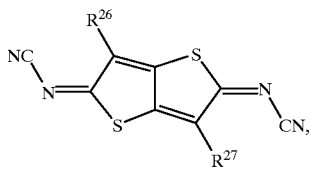

(X)
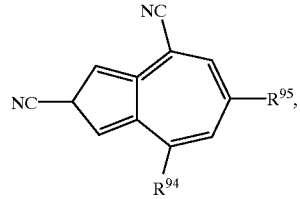

(XI)
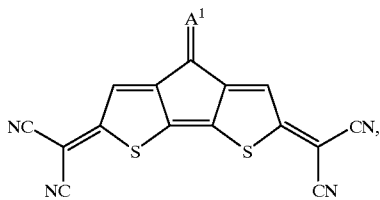

(XII)
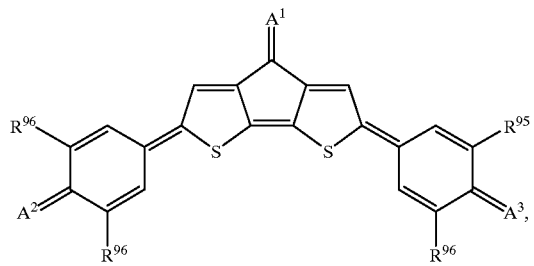

(CI)
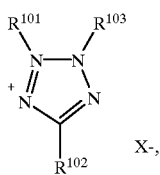
X-, (CII)
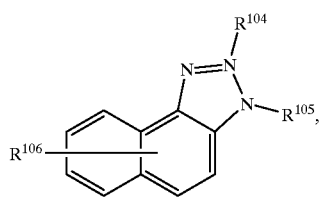
X-

(CIII)
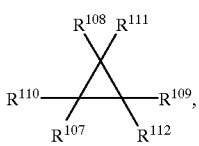

(CIV)
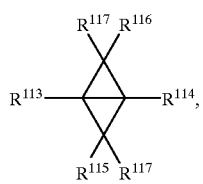

in which $R^2$ to $R^5$, $R^8$, $R^9$, $R^{16}$ to $R^{19}$, independently of one another, are $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, or $R^4$; $R^5$ or $R^8$; $R^9$ together can form a —$(CH_2)_2$— or —$(CH_2)_3$— bridge, $R^6$, $R^7$ and $R^{22}$ to $R^{25}$, independently of one another, are hydrogen, $C_1$- to $C_4$-alkyl, $C_1$- to $C_4$-alkoxy, halogen, cyano, nitro or $C_1$- to $C_4$-alkoxycarbonyl, or $R^{22}$; $R^{23}$ and/or $R^{24}$; $R^{25}$ can form a —CH═CH—CH═CH bridge, $R^{10}$; $R^{11}$, $R^{10}$; $R^{13}$, $R^{12}$; $R^{13}$ and $R^{14}$; $R^{15}$, independently of one another, are hydrogen or in pairs are a —$(CH_2)_2$—, —$(CH_2)_3$— or —CH═CH— bridge, $R^{20}$ and $R^{21}$, independently of one another, are O, N—CN, C(CN)$_2$ or N—$C_6$- to $C_{10}$-aryl, $R^{26}$ and $R^{27}$ are hydrogen, $C_1$- to $C_4$-alkyl, $C_1$- to $C_4$-alkoxy, halogen, cyano, nitro, $C_1$- to $C_4$-alkoxycarbonyl or $C_6$- to $C_{10}$-aryl, $R^{69}$ to $R^{74}$, $R^{80}$ and $R^{81}$, independently of one another, are hydrogen or $C_1$- to $C_6$-alkyl, and $R^{69}$ to $R^{74}$, independently of one another, are additionally aryl, or $R^{69}$; $R^{12}$, $R^{70}$; $R^{13}$, $R^{73}$; $R^{80}$ and/or $R^{74}$; $R^{81}$ together form a —CH=CH—CH=CH— bridge, $E^1$ and $E^2$, independently of one another, are O, S, $NR^1$ or $C(CH_3)_2$, or $E^1$ and $E^2$ together form an —N—$(CH_2)_2$—N— bridge, $R^1$ is $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, $Z^1$ is a direct bond, —CH=CH—, —C(CH$_3$)=CH—, —C(CN)=CH—, —CCl=CCl—, —C(OH)=CH—, —CCl=CH—, —C≡C—, —CH=N—N=CH—, —C(CH$_3$)=N—N=C(CH$_3$)—, —CCl=N—N=CCl— or —C$_6$H$_4$—, $Z^2$ is —$(CH_2)_r$— or —CH$_2$—C$_6$H$_4$—CH$_2$—, r is an integer from 1 to 10, $R^{94}$ and $R^{95}$, independently of one another, are hydrogen or cyano, $R^{101}$ to $R^{105}$, independently of one another, are $C_6$- to $C_{10}$-aryl or an optionally benzo-fused aromatic or quasi-aromatic five- or six-membered heterocyclic ring, $R^{107}$, $R^{109}$, $R^{113}$ and $R^{114}$, independently of one another, are a radical of the formulae (CV) to (CVII)

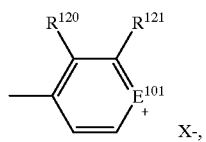
(CV)

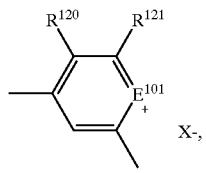
(CVI)

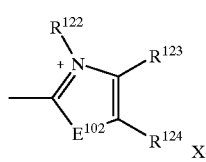
(CVII)

$R^{108}$, $R^{115}$ and $R^{116}$, independently of one another, are $C_6$- to $C_{10}$-aryl or a radical of the formula (CV)

$R^{110}$ to $R^{112}$, $R^{117}$ and $R^{118}$ independently of one another, are hydrogen, $C_1$- to $C_4$-alkyl, halogen or cyano, $E^{101}$ and $E^{102}$, independently of one another, are O, S or N—$R^{119}$, $R^{119}$ and $R^{122}$, independently of one another, are $C_1$–$C_{18}$-alkyl, $C_2$- to $C_8$-alkenyl, $C_4$- to $C_7$-cycloalkyl, $C_7$- to $C_{15}$-aralkyl or $C_6$- to $C_{10}$-aryl, $R^{106}$, $R^{120}$, $R^{121}$, $R^{123}$ and $R^{124}$, independently of one another, are hydrogen, $C_1$- to $C_4$-alkyl, $C_1$- to $C_4$-alkoxy, halogen, cyano, nitro or $C_1$- to $C_4$-alkoxycarbonyl or $R^{120}$, $R^{121}$ or $R^{123}$, $R^{124}$ together form a —CH=CH—CH=CH— bridge, $A^1$, $A^2$ and $A^3$, independently of one another, are O or $C(CN)_2$, $R^{96}$ is hydrogen, phenyl or tert-butyl and X is an anion which is redox-inert under the conditions.

Examples of suitable oxidizable substances $RED_1$ are, for example,

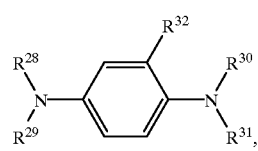
(XX)

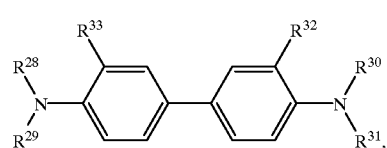
(XXI)

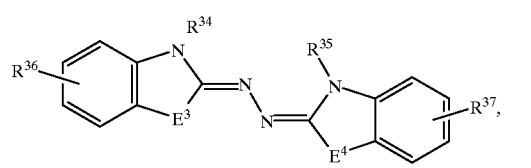
(XXII)

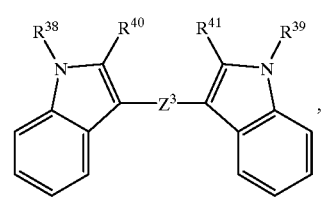
(XXIII)

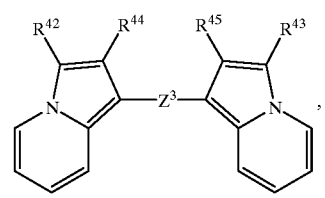
(XXIV)

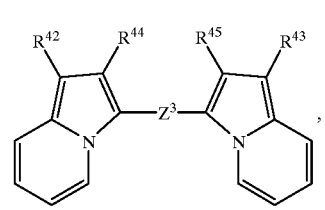
(XXV)

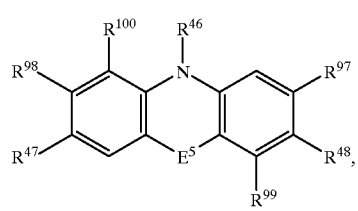
(XXVI)

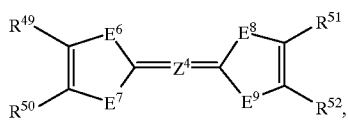

(XXVII)

(XXVIII)

(XXIX)

(XXX)

(XXXI)

(XXXII)

(XXXIII)

in which
R$^{28}$ to R$^{31}$, R$^{34}$, R$^{35}$, R$^{38}$, R$^{39}$, R$^{46}$, R$^{53}$ and R$^{54}$, independently of one another, are C$_1$- to C$_{18}$-alkyl, C$_2$- to C$_{12}$-alkenyl, C$_4$- to C$_7$-cycloalkyl, C$_7$- to C$_{15}$-aralkyl or C$_6$- to C$_{10}$-aryl, R$^{32}$, R$^{33}$, R$^{36}$, R$^{37}$, R$^{40}$, R$^{41}$, R$^{42}$ to R$^{45}$, R$^{47}$, R$^{48}$, R$^{49}$ to R$^{52}$, R$^{55}$ to R$^{58}$ and R$^{97}$ to R$^{100}$, independently of one another, are hydrogen, C$_1$- to C$_4$-alkyl, C$_1$- to C$_4$-alkoxy, halogen, cyano, nitro, C$_1$- to C$_4$-alkoxycarbonyl, C$_6$- to C$_{10}$-aryl or C$_6$- to C$_{10}$-aryloxy, and R$^{57}$ and R$^{58}$ are additionally an aromatic or quasi-aromatic, five- or six-membered heterocyclic ring, which is optionally benzo-fused, and R$^{48}$ is additionally NR$^{75}$R$^{76}$, or R$^{49}$; R$^{50}$, R$^{51}$; R$^{52}$ and/or R$^{48}$; R$^{97}$ or R$^{48}$; R$^{99}$, R$^{97}$; R$^{98}$ or R$^{98}$; R$^{100}$, independently of one another, form a —(CH$_2$)$_3$—, —(CH$_2$)$_4$—, —(CH$_2$)$_5$— or —CH=CH—CH↑CH— bridge, Z$^3$ is a direct bond, a —CH=CH— or —N=N— bridge, =Z$^4$= is a direct double bond, a =CH—CH= or =N—N= bridge, E$^3$ to E$^5$, E$^{10}$ and E$^{11}$, independently of one another, are O, S, NR$^{59}$ or C(CH$_3$)$_2$, and E$^5$ is additionally C=O or SO$_2$, E$^3$ and E$^4$, independently of one another, may additionally be —CH=CH—, E$^6$ to E$^9$, independently of one another, are S, Se or NR$^{59}$, R$^{59}$, R$^{75}$ and R$^{76}$, independently of one another, are C$_1$- to C$_{12}$-alkyl, C$_2$- to C$_8$-alkenyl, C$_4$- to C$_7$-cycloalkyl, C$_7$- to C$_{15}$-aralkyl or C$_6$- to C$_{10}$-aryl, and R$^{75}$ is additionally hydrogen or R$^{75}$ and R$^{76}$ in the meaning of NR$^{75}$R$^{76}$ are, together with the N atom to which they are bonded, a five- or six-membered ring, which optionally contains further heteroatoms, R$^{61}$ to R$^{68}$, independently of one another, are hydrogen, C$_1$- to C$_6$-alkyl, C$_1$- to C$_4$-alkoxy, cyano, C$_1$- to C$_4$-alkoxycarbonyl or C$_6$- to C$_{10}$-aryl, and R$^{61}$; R$^{62}$ and R$^{67}$; R$^{68}$, independently of one another, additionally form a —(CH$_2$)$_3$—, —(CH$_2$)$_4$— or —CH=CH—CH=CH— bridge, or R$^{62}$; R$^{63}$, R$^{64}$; R$^{65}$ and R$^{66}$; R$^{67}$ form an —O—CH$_2$CH$_2$—O— or —O—CH$_2$CH$_2$CH$_2$—O— bridge, v is an integer between 0 and 100, R$^{82}$, R$^{83}$, R$^{88}$ and R$^{89}$, independently of one another, are C$_1$- to C$_{18}$-alkyl, C$_2$- to C$_{12}$-alkenyl, C$_4$- to C$_7$-cycloalkyl, C$_7$- to C$_{15}$-aralkyl or C$_6$- to C$_{10}$-aryl, R$^{84}$ to R$^{87}$ and R$^{90}$ to R$^{93}$, independently of one another, are hydrogen or C$_1$- to C$_6$-alkyl, or R$^{84}$; R$^{86}$, R$^{85}$; R$^{87}$, R$^{90}$; R$^{92}$ and/or R$^{91}$; R$^{93}$ together form a —CH=CH—CH=CH— bridge.

Likewise suitable as RED$_1$ are anions, such as, for example, I$^-$, I$_3^-$, Br$^-$ and SCN$^-$.

Examples of optionally oligomeric or polymeric redox systems which are linked via a bridge B are those of the formula

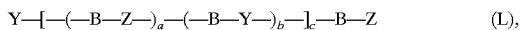   (L), in which

Y and Z, independently of one another, are a radical OX$_2$ or RED$_1$, where

OX$_2$ is the radical of a reversibly electrochemically reducible redox system, and RED$_1$ is the radical of a reversibly electrochemically oxidizable redox system, B is a bridging unit, c is an integer from 0 to 1000, and a and b, independently of one another, are an integer from 0 to 100.

(a+b)·c is preferably ≦10,000.

The term reversibly electrochemically reducible or oxidizable here is taken to mean that the electron transfer can take place with or without a change in the σ-structure, entirely in the sense of the abovementioned definition of the $OX_2$ and $RED_1$ according to the invention.

In particular, the electrochromic compounds of the formula (L) are taken to mean oligomeric compounds of the formulae $$OX_2\text{—}B\text{—}RED_1 \quad (La),$$

$$OX_2\text{—}B\text{—}RED_1\text{—}B\text{—}OX_2 \quad (Lb),$$

$$RED_1\text{—}B\text{—}OX_2\text{—}B\text{—}RED_1 \quad (Lc),$$

$$OX_2\text{—}(B\text{—}RED_1\text{—}B\text{—}OX_2)_d\text{—}B\text{—}REd_1 \quad (Ld),$$

$$OX_2\text{—}(B\text{—}OX_2)_e\text{—}B\text{—}OX_2 \quad (Le) \text{ or}$$

$$RED_1\text{—}(B\text{—}RED_1)_e\text{—}B\text{—}RED_1 \quad (Lf)$$

in which $OX_2$, $RED_1$ and B are as defined above, d is an integer from 1 to 5, and e is an integer from 0 to 5, where $OX_2$, $RED_1$ and/or B, in particular if d and/or e are >1, can have different meanings in each recurring unit.

In particular, the electrochromic compounds of the formula (L) are taken to mean polymeric compounds of the formulae $$OX_2\text{—}(B\text{—}RED_1\text{—}B\text{—}OX_2)_d\text{—}B\text{—}RED_1 \quad (Ld),$$

$$OX_2\text{—}(B\text{—}OX_2)_e\text{—}B\text{—}OX_2 \quad (Le),$$

$$RED_1\text{—}(B\text{—}RED_1)_e\text{—}B\text{—}RED_1 \quad (Lf),$$

in which $OX_2$, $RED_1$ and B are as defined above, d is an integer from 5 to 100,000, preferably from 10 to 10,000, and e is an integer from 5 to 100,000, preferably from 10 to 10,000, where $OX_2$, $RED_1$ and/or B, in particular if d and/or e are >1, can have different meanings in each recurring unit.

Oligomeric or polymeric electrochromic compounds which do not conform to the formula (L) are, in particular, side-chain polymers of the formulae $$\ldots\text{—}(D)_f\text{—}\ldots\text{—}(E\text{—}B^1\text{—}Y)_g\text{—}\ldots\text{—}(F\text{—}B^2\text{—}Z)_h\text{—}(CL).\text{and}$$

$$\ldots\text{—}(D)_f\text{—}\ldots\text{—}[E\text{—}(B^1\text{—}Y)_i\text{—}(B^2\text{—}Z)_j]_g\text{—}\ldots\text{—}(F\text{—}B^2\text{—}Z)_h\text{—}\ldots \quad (CLX),$$

in which

D, E and F are components of an oligomer or polymer chain, where the units D, E and F may be either randomly distributed or arranged in blocks, $B^1$ and $B^2$ are a bridging unit, Y and Z, independently of one another, are a radical $OX_2$ or $RED_1$, where $OX_2$ is the radical of a reversibly electrochemically reducible redox system, and $RED_1$ is the radical of a reversibly electrochemically oxidizable redox system, f, g and h, independently of one another, are an integer from 1 to 100,000, in particular from 1 to 10,000, where f+g+h>2, f and h, independently of one another, may alternatively be 0, and i and j, independently of one another, are an integer from 1 to 100, in particular from 1 to 10, very particularly 1 or 2.

In particular, the oligomers or polymers of the formula (CL) are taken to mean those of the formulae $$\ldots\text{—}(D)_f\text{—}\ldots\text{—}(E\text{—}B^1\text{—}OX_2)_g\text{—}\ldots\text{—}(F\text{—}B^2\text{—}RED_1)_h\text{—} \ldots \quad (CLa),$$

$$\ldots\text{—}(D)_f\text{—}\ldots\text{—}(E\text{—}B^1\text{—}OX_2)_g\text{—} \quad (CLb),$$

$$\ldots\text{—}(D)_f\text{—}\ldots\text{—}(F\text{—}B^2\text{—}RED_1)_h\text{—}\ldots \quad (CLc),$$

$$\ldots\text{—}(D)_f\text{—}\ldots\text{—}[E\text{—}B^1\text{—}OX_2\text{—}B^2\text{—}RED_1]_g\text{—}\ldots.(CLXa) \text{ or}$$

$$\ldots\text{—}(D)_f\text{—}\ldots\text{—}[F\text{—}B^2\text{—}RED_1\text{—}B^1\text{—}OX_2]_h\text{—}\ldots \quad (CLXb)$$

in which f is an integer from 0 to 10,000, g and h, independently of one another, are an integer from 1 to 10,000, preferably from 1 to 1000, particularly preferably from 1 to 100, and the other radicals are as defined above, where $OX_2$ and/or $RED_1$, in particular if g and/or h are >1, can have different meanings in each recurring unit.

f is preferably >10·(g+h), particularly preferably >100·(g+h).

The terms $OX_2$ and $RED_1$ in the formulae (L) and (La) to (Lf) and (CL) and (CLa) to (CLc) and (CLX) and (CLXa) to (CLXb) are taken to mean, in particular, radicals of the above-described redox systems of the formulae (I) to (X), (CI) to (CIV) and (XX) to (XXXIII), where the bonding to the bridging unit B, $B^1$ or $B^2$ takes place via one of the radicals $R^2$ to R19, $R^{22}$ to $R^{27}$, $R^{28}$ to $R^{58}$, $R^{61}$, $R^{62}$, $R^{67}$, $R^{68}$, $R^{83}$, $R^{88}$, $R^{122}$ or, if one of the radicals $E^1$ or $E^2$ is $NR^1$ or one of the radicals $E^3$ to $E^{11}$ is $NR^{59}$ or one of the radicals $E^{101}$ to $E^{102}$ is $NR^{119}$, via $R^1$, $R^{59}$ or $R^{119}$, and said radicals then represent a direct bond, and B, $B^1$ or $B^2$, independently of one another, are a bridge of the formula —$(CH_2)n$— or —$Y^1{}_s$—$[(CH_2)_m$—$Y^2]_o$—$(CH_2)_p$—$Y^3{}_q$—, which may be substituted by $C_1$- to $C_4$-alkyl, $C_1$- to $C_4$-alkoxy, halogen or phenyl, $Y^1$ to $y^3$, independently of one another, are O, S, $NR^{60}$, COO, CONH, NHCONH, cyclopentanediyl, cyclohexanediyl, phenylene or naphthylene, $R^{60}$ is $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n is an integer from 1 to 12, m and p, independently of one another, are an integer from 0 to 8, o is an integer from 0 to 6, and q and s, independently of one another, are 0 or 1, where, for o>1, $Y^2$ and m may be different in each recurring unit.

$OX_2$ or $RED_1$ in said formulae (L) and (La) to (Li) and (CL) and (CLa) to (CUc) and (CLX) and (CLXa) to (CLXb) are likewise taken to mean metal complexes if they can be bonded to the bridging units B, $B^1$ or $B^2$ via a covalent bond. An example which may be mentioned is ferrocene.

$OX_2$ and $RED_1$ in the formulae (L) and (La) to (Lf) and (CL) and (CLa) to (CLc) and (CLX) and (CLXa) to (CLXb) are very particularly taken to mean radicals of the above-described redox systems of the formulae (I), (V), (XX), (XXII), (XXIII), (XXV), (XXVI) and (XXXIII) and for RED$_1$ ferrocene.

D, E and F in the formulae (CL) and (CLa) to (CLc) and (CLX) and (CLXa) to (CLXb) are taken to mean units which result in the construction of oligo- or polyacrylates, -methacrylates, -styrenes, -siloxanes, -carbonates, -amides, -esters, -ureas, -urethanes or -saccharides. In particular, they are taken to mean oligo- and polyacrylates, -methacrylates and -styrenes and co-oligomers or copolymers thereof.

D preferably conforms to the formula $$—CHY^{10}—CHY^{11}— \quad (CLXXI)$$

and E and F preferably conform, independently of one another, to the formula $$—CHY^{12}—CHY^{13}— \quad (CLXXMI),$$

in which

- $Y^{10}$ and $Y^{12}$, independently of one another, are hydrogen or $C_1$- to $C_4$-alkyl,
- $Y^{11}$ is hydrogen, halogen, $C_1$- to $C_4$-alkyl, aryl or —COO—$C_1$- to $C_8$-alkyl, and
- $Y^{13}$ is a direct bond or one of the bridges of the formula —O—, —CO—O—, —CO—NH— or —$C_6H_4$— to $B^1$ or $B^2$.

Examples are according to the formula (La)

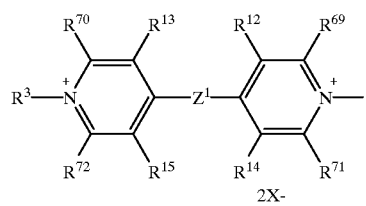
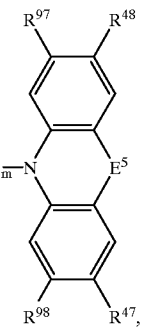
(La1)

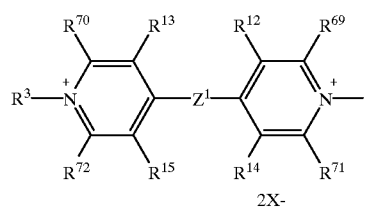
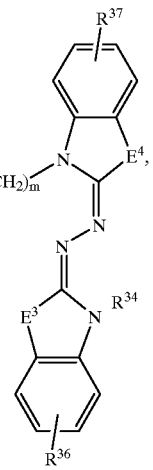
(La2)

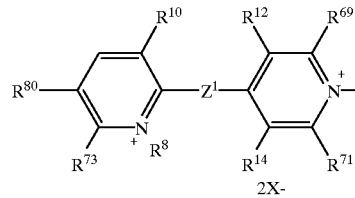
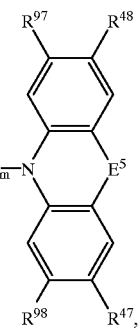
(La3)

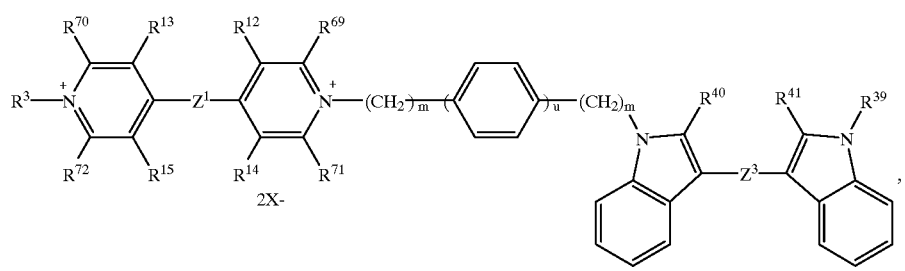
(La4)
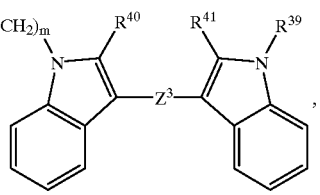
(La5)
according to the formula (Lb)
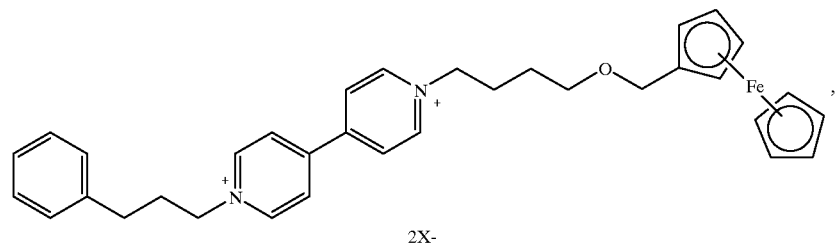
(Lb1)
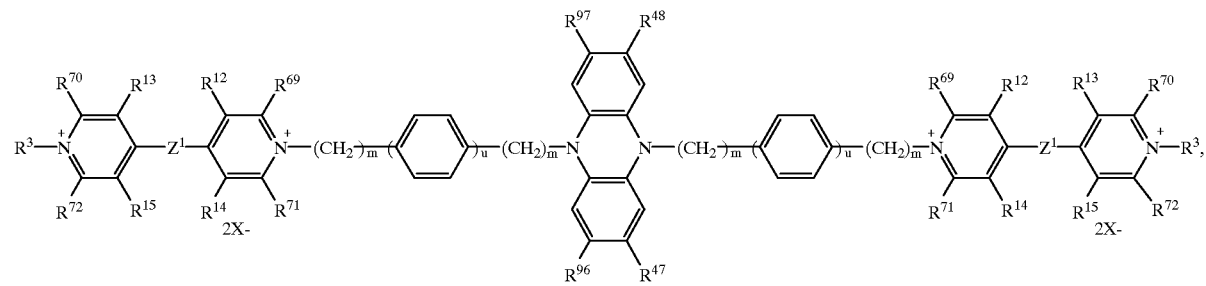
(Lb2)
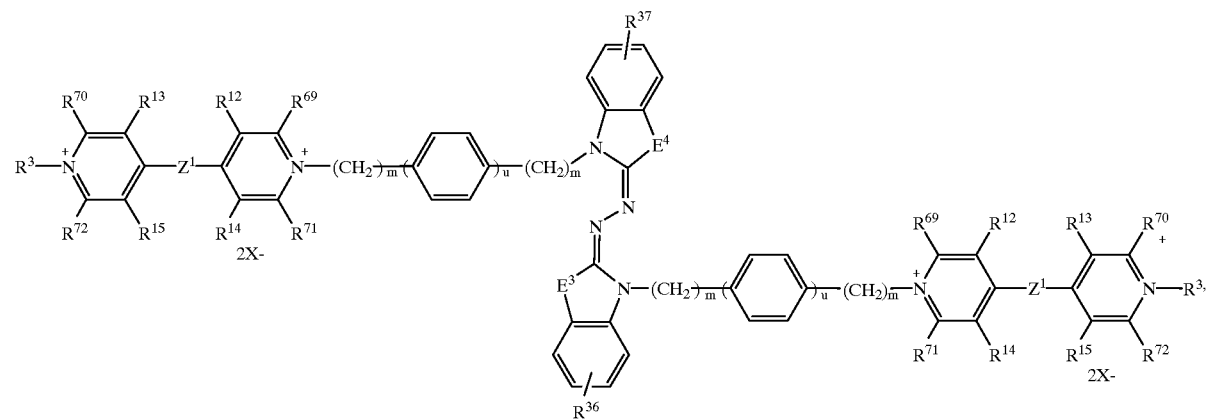

-continued
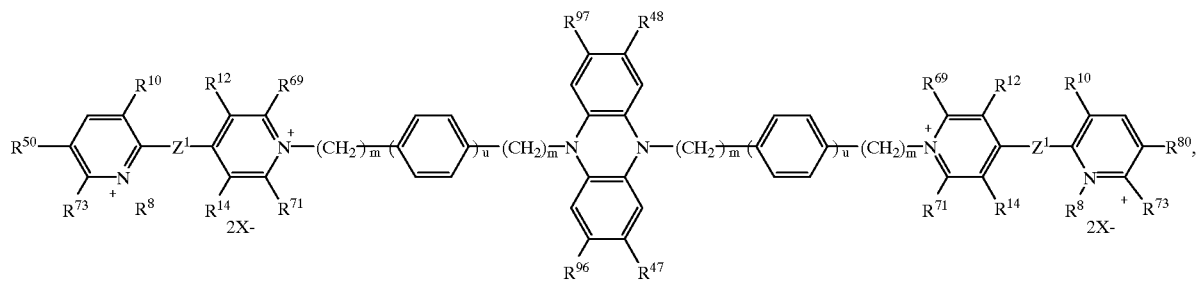
(Lb3)
according to the formula (Lc)
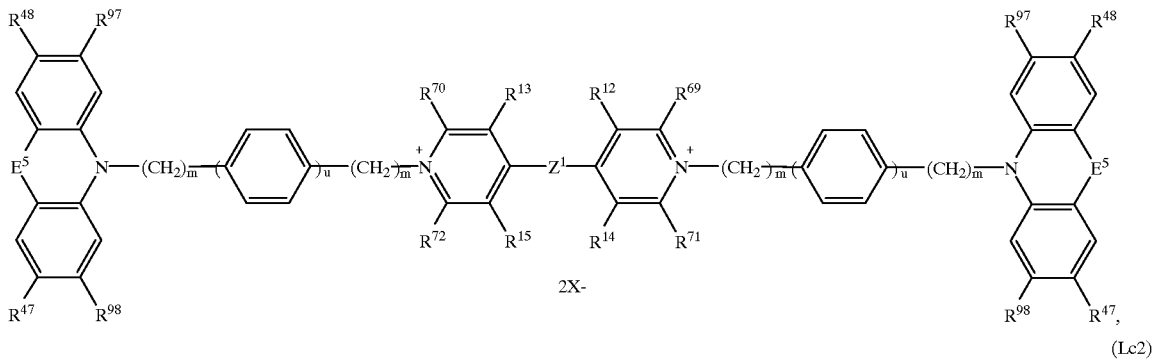
(Lc1)
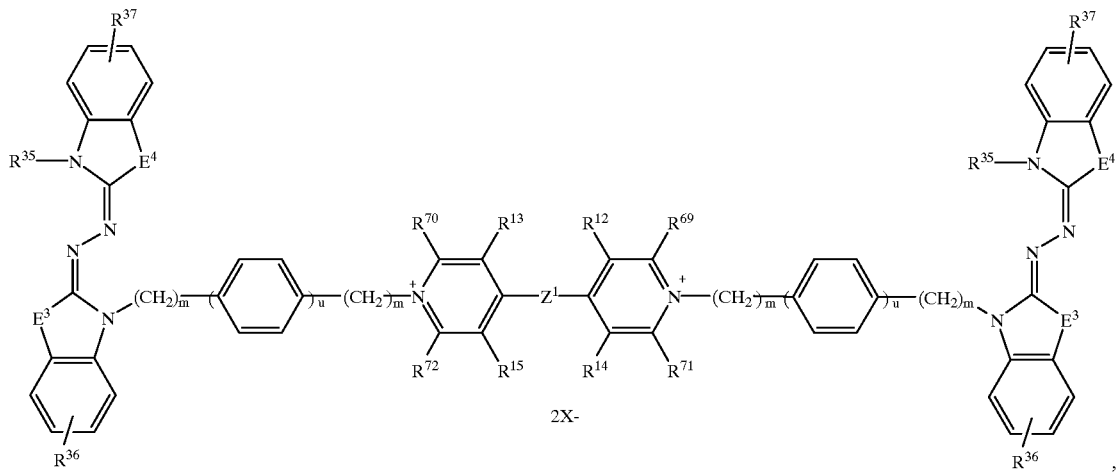
(Lc2)
according to the formula (Ld)

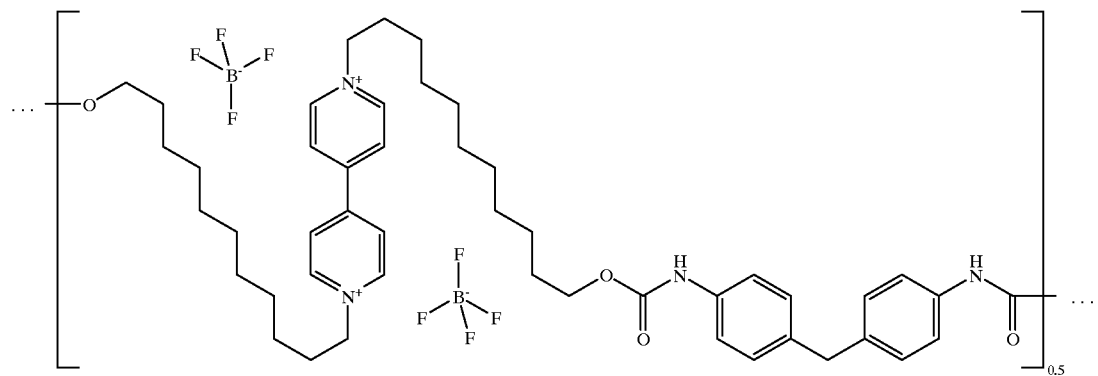
(Ld1)
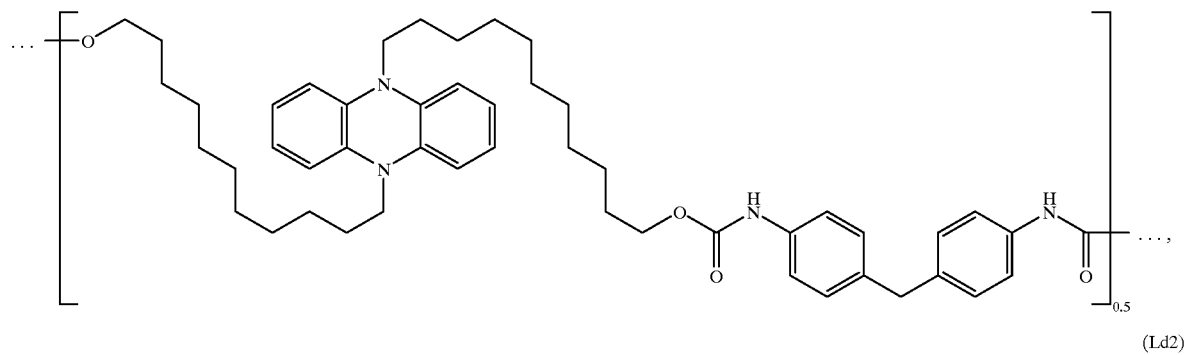
(Ld2)
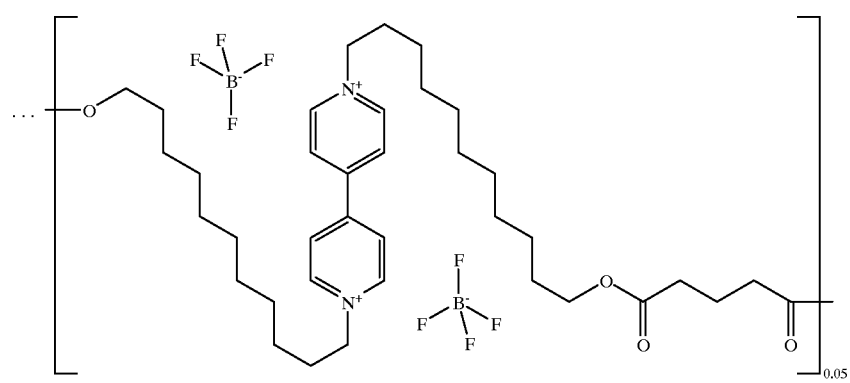
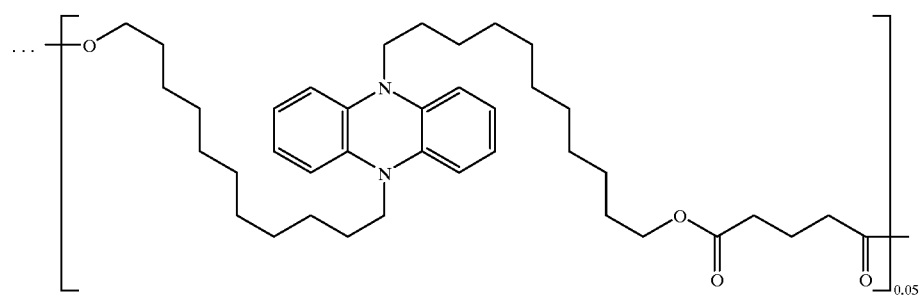
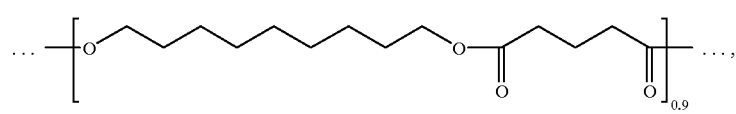

-continued
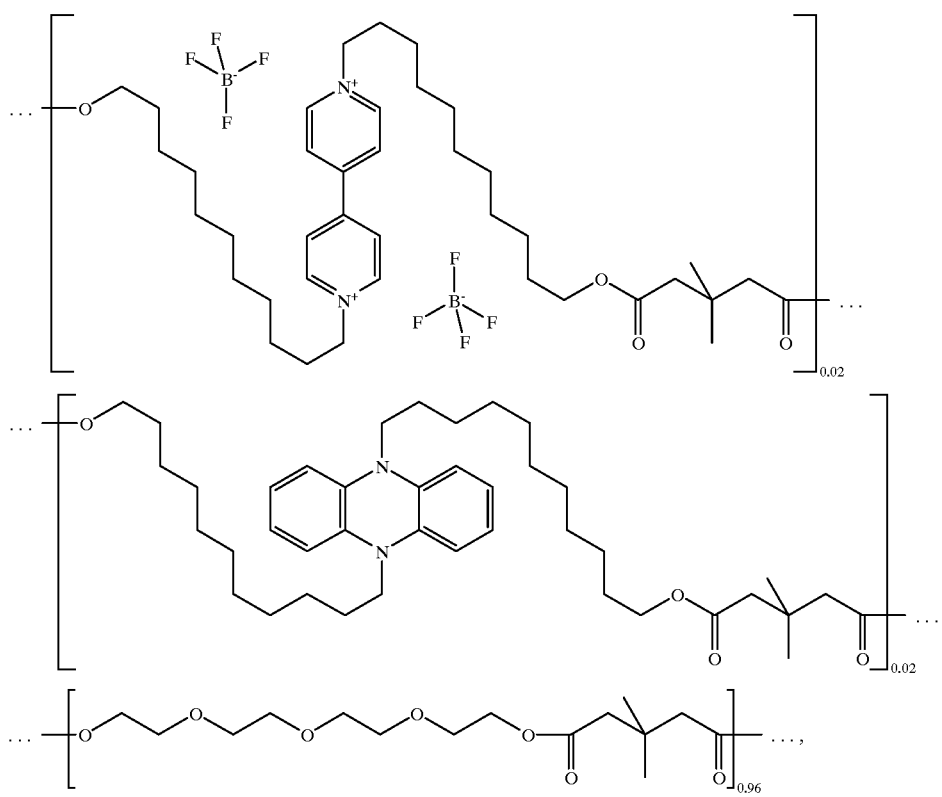
35
according to the formula (Le)
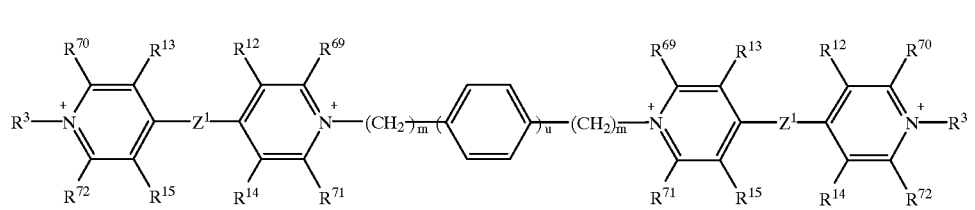
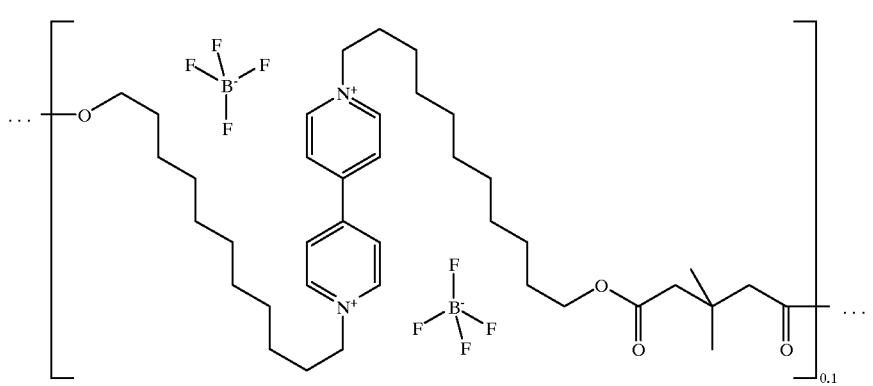

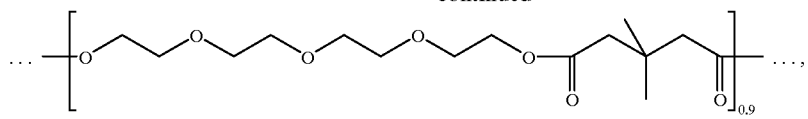
according to the formula (Lf)
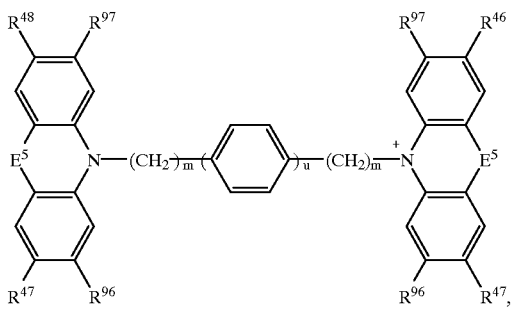
(Lf1)
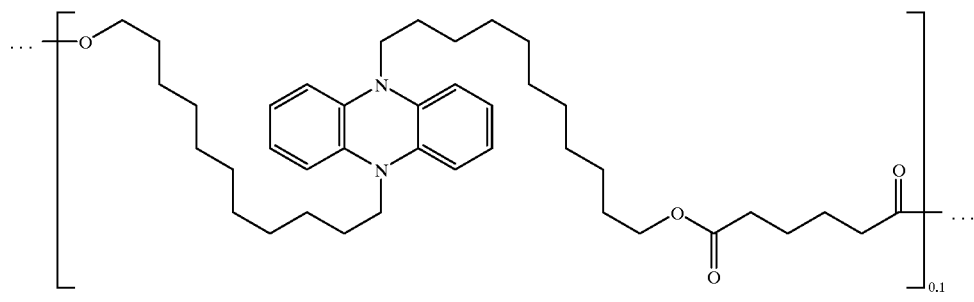
(Lf2)
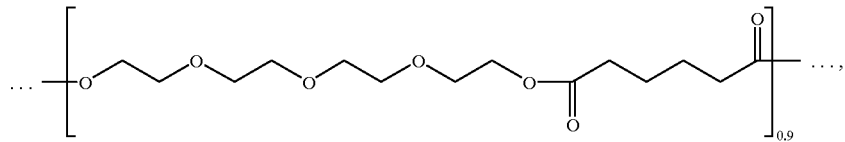
in which
m is an integer from 1 to 5,
u is 0 or 1, and
the other radicals are as defined above.
Examples are according to the formula (CLa)
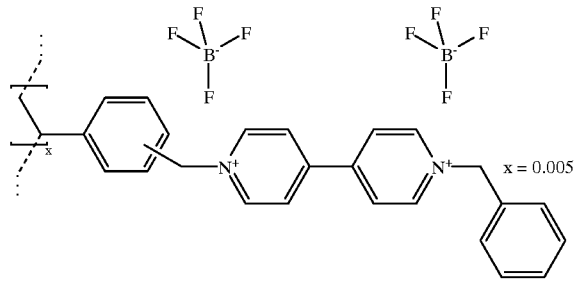
(CLa1)
-continued
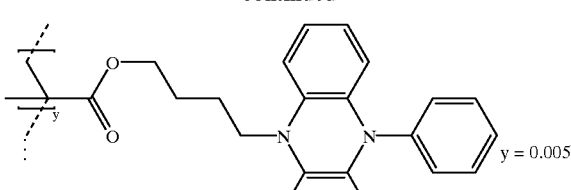

-continued

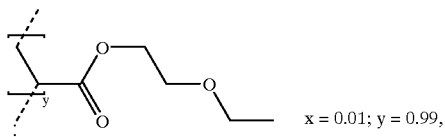
x = 0.01; y = 0.99, according to the formula (CLXa)

(CLXa1)

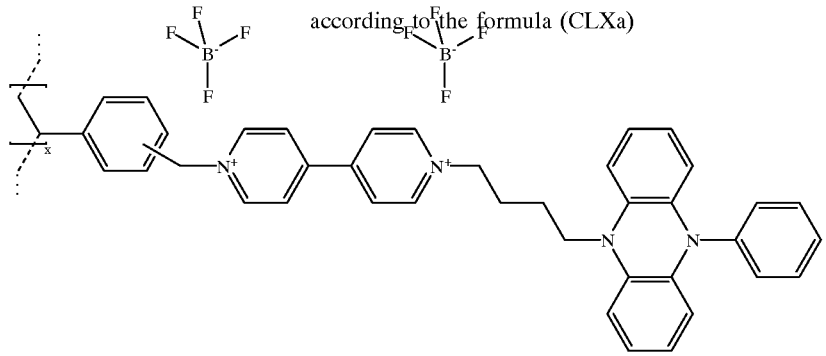

x = 0.01; y = 0.99.

according to the formula (CLb)

(CLb1)

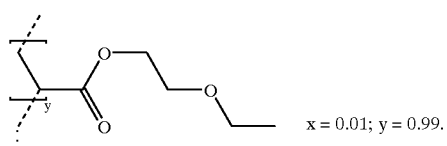
z = 0.01; y = 0.99, according to the formula (CLc)

(CLc1)

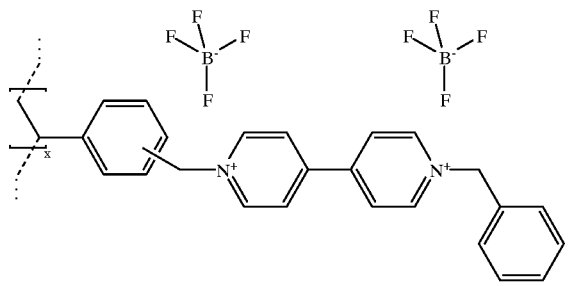

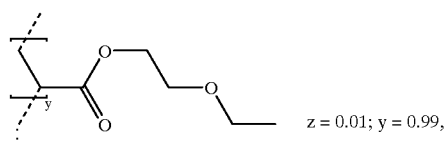

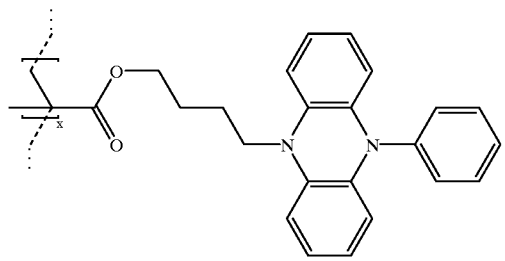

Examples of metal salts or metal complexes which can be employed as $OX_2$ or $RED_1$ are $Fe^{3+/2+}$, $Ni^{3+/2+}$, $Co^{3+/2+}$, $Cu^{2+/+}$, $[Fe(CN)_6]^{3-/4-}$, $Fe_4[Fe(CN)_6]_3^{0/4-}$, $[Co(CN)_6]^{3-/4-}$, $[Fe(cyclopentadienyl)_2]^{0/+}$, $Lu(Pc)^{2+}$ to $^{2-}$ (Pc= phthalocyanine), $Fe[Fe(CN)_6]^{0/1-}$.

Suitable counterions for metal ions and cationic complexes are all redox-inert anions $X^{31}$, as described in greater detail below, and suitable counterions of the anionic complexes are all redox-inert cations $M^{t+}$, for example alkali metals or quaternized ammonium salts, such as $Na^+$, $K^+$, $N(CH_3)_4^+$, $N(C_4H_9)_4^+$, $C_6H_5CH_2N(CH_3)_3^+$ and others.

Preference is likewise given to an electrochromic filter which comprises mixtures of the electrochromic substances mentioned above in general terms and as preferred. Examples of such mixtures are (I)+(CI)+(XXVI), (I)+(IV)+ (XXII), (La)+(I)+(XXVI), (La)+(CI), (LX)+(LXI), (LXV)+ (XXVI), (CLII)+(XXVI), but this should not be taken to mean an expression of any restriction.

The mixing ratios are variable within broad limits. They allow optimization of a desired hue, in particular a grey shade, and/or optimization of the desired dynamics of the device.

In the abovementioned substituent meanings, alkyl radicals, including derivatives, for example alkoxy or aralkyl radicals, are preferably those having 1 to 12 carbon atoms, in particular having 1 to 8 carbon atoms, unless stated otherwise. They can be straight-chain or branched and can optionally contain further substituents, such as $C_1$- to $C_4$-alkoxy, fluorine, chlorine, hydroxyl, cyano, $C_1$- to $C_4$-alkoxycarbonyl or COOH.

The term cycloalkyl radicals is preferably taken to mean those having 3 to 7 carbon atoms, in particular having 5 or 6 carbon atoms.

Alkenyl radicals are preferably those having 2 to 8 carbon atoms, in particular 2 to 4 carbon atoms.

Aryl radicals, including those in aralkyl radicals, are phenyl or naphthyl radicals, in particular phenyl radicals. They can be substituted by 1 to 3 of the following radicals:

$C_1$- to $C_6$-alkyl, $C_1$- to $C_6$-alkoxy, fluorine, chlorine, bromine, cyano, hydroxyl, $C_1$- to $C_6$-alkoxycarbonyl or nitro. Two adjacent radicals may also form a ring.

The term optionally benzo-fused aromatic or quasi-aromatic five- or six-membered heterocyclic rings is taken to mean, in particular, imidazole, benzimidazole, oxazole, benzoxazole, thiazole, benzothiazole, indole, pyrazole, triazole, thiophene, isothiazole, benzisothiazole, 1,3,4- or 1,2,4-thiadiazole, pyridine, quinoline, pyrimidine and pyrazine. They may be substituted by 1 to 3 of the following

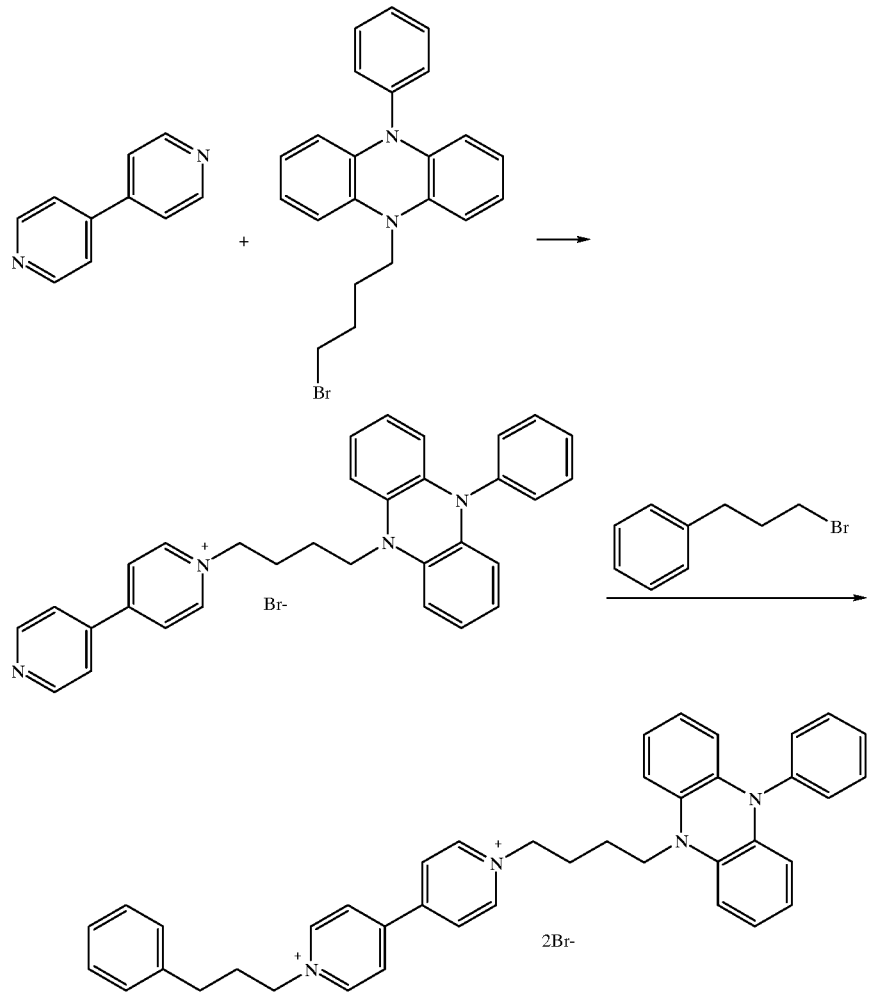

radicals: $C_1$- to $C_6$-alkyl, $C_1$- to $C_6$-alkoxy, fluorine, chlorine, bromine, cyano, nitro, hydroxyl, mono- or di-$C_1$- to $C_6$-alkylamino, $C_1$- to $C_6$-alkoxycarbonyl, $C_1$- to $C_6$-alkylsulphonyl, $C_1$- to $C_6$-alkanoylamino, phenyl or naphthyl. Two adjacent radicals may also form a ring.

The electrochromic substances are either known (Topics in Current Chemistry, Vol. 92, pp. 1–44, (1980), Angew. Chem. 90, 927 (1978), Adv. Mater. 3, 225, (1991), DE-A-3 917 323, J. Am. Chem. Soc. 117, 8528 (1995), J. C. S. Perkin II 1990, 1777, DE-AX 435 211, EP-A476 456, EP-A476 457, DE-A-4 007 058, J. Org. Chem. 57, 1849 (1992) and J. Am. Chem. Soc. 99, 6120, 6122 (1977) or can be prepared analogously. The compounds of the formula (L) are likewise known (WO 97/30134) or can be synthesized from building blocks which are known per se, for example in accordance with the following scheme:

The compounds of the formula (CL) and (CLX) can be prepared by polymerization from building blocks which are known per se, for example the following:

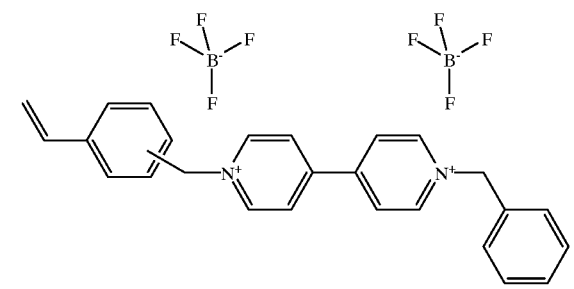

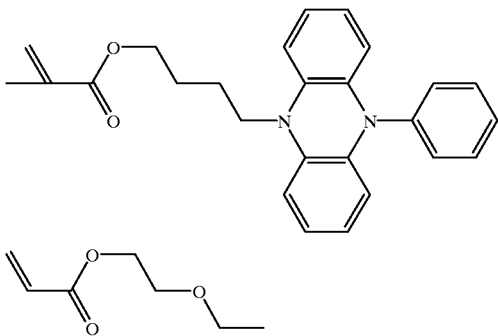

The polymerization is preferably carried out in a solvent, for example dimethylformamide, with addition of a free-radical initiator, for example azobisisobutyronitrile, at from room temperature to the boiling point of the medium, preferably at 40–80° C.

Synthetically required ions, such as bromide, are subsequently replaced by redox-inert ions.

Particular preference is given to the electrochromic compounds of the formulae (I), (II), (I), (IV), (V), (XX), (XXII), (XXm), (XXVI), (XXVII) and ferrocene, and the bridged compounds of the formula (L) or side-chain polymers of the formula (CL) or (CLX) containing at least one of these formulae as $OX_2$ or $RED_1$.

In this selection and likewise in the particular and exceptional selections listed below of electrochromic compounds, it must always be ensured that the electrochromic medium contains at least one $OX_2$ and at least one $RED_1$. If, for example, $OX_2$=formula (I), the electrochromic medium must also contain an REDJ, preferably from the selection of the preferred $RED_1$ of the formulae (XX), (XXII), (XXIII), (XXVI) and (XXVII), but also from the above selection, listed in general terms, of the $RED_1$ of the formulae (XX) to (XXXIII) and the abovementioned metal salts, complexes or anions $X^-$ which are suitable as $RED_1$. This also applies analogously to the preferred and particularly preferred $RED_1$.

Very particular preference is given to the electrochromic compounds of the formulae (I), (II), (IV), (V), (XXII) (XXII), (XXVI) and (XXVII)
in which
  $R^2$, $R^3$, $R^8$ and $R^9$, independently of one another, are methyl, ethyl, propyl, butyl, pentyl, hexyl, heptyl, benzyl, phenethyl, phenylpropyl, phenyl, 2-methylphenyl or 2,6-dimethylphenyl, or
  $R^8$ and $R^9$ together form a —(CH$_2$)$_2$— or —(CH$_2$)$_3$— bridge,
  $R^{10}$ to $R^{15}$ are hydrogen,
  $R^{69}$ to $R^{73}$, $R^{80}$ and $R^{81}$, independently of one another, are hydrogen or methyl, or
  $R^{12}$; $R^{69}$, $R^{13}$; $R^{70}$, $R^{73}$; $R^{80}$ and/or $R^{74}$; $R^{81}$ form a —CH=CH—CH=CH— bridge,
  $Z^1$ is a direct bond or —CH=CH—,
  $Z^2$ is —(CH$_2$)$_r$—,
  r is an integer from 2 to 6,
  $X^-$ is an anion which is redox-inert under the conditions,
  $R^{34}$, $R^{35}$, $R^{38}$ and $R^{39}$, independently of one another, are methyl, ethyl, propyl, butyl, benzyl, phenethyl, phenylpropyl or phenyl,
  $R^{36}$ and $R^{37}$ are hydrogen,
  $Z^3$ is a direct bond or a —CH=CH— bridge,
  $Z^4$ is a direct double bond,
  $R^{40}$ and $R^{41}$ are identical and are hydrogen or methyl,
  $E^3$ and $E^4$ are identical and are S, N—$R^{59}$ or C(CH$_3$)$_2$,
  $E^5$ is NR$^{59}$
  $E^6$ to $E^9$ are identical and are S,
  $R^{47}$, $R^{48}$, $R^{97}$ and $R^{98}$, independently of one another, are hydrogen, methyl, methoxy, cyano, phenyl or phenoxy,
  $R^{49}$ to $R^{52}$, independently of one another, are hydrogen, methyl, cyano or methoxycarbonyl, or
  $R^{49}$; $R^{50}$ and/or $R^{51}$; $R^{52}$ form a —(CH$_2$)$_3$— or —CH=CH—CH=CH— bridge,
  $R^{46}$ and $R^{59}$, independently of one another, are methyl, ethyl, propyl, butyl or phenyl, and
  $R^{99}$ and $R^{100}$ are hydrogen,
and the bridged compounds of the formula (L), in particular of the formula (La), which contain at least one of these formulae as $OX_2$ or $RED_1$, where
  B is —(CH$_2$)$_n$— and
  n is an integer from 3 to 6,
and the side-chain polymers of the formula (CL) and (CLX), in particular of the formula (CLXa), which contain at least one of these formulae as $OX_2$ or $RED_1$, where
  D is the formula (CLXXI),
  E and F are the formula (CLXXII),
  $Y^{10}$ and $Y^{12}$, independently of one another, are hydrogen or methyl,
  $Y^{11}$ is —COOCH$_3$ or —COOCH$_2$CH$_2$OCH$_2$CH$_3$,
  $Y^{13}$ is a bridge of the formulae —CO—O— or —C$_6$H$_4$— to $B^1$ or $B^2$,
  $B^1$ and $B^2$, independently of one another, are a bridge of the formulae —(CH$_2$)$_n$—, and
  n is an integer from 1 to 6.

Very outstandingly suitable for the purposes of the invention are the electrochromic compounds of the formulae (I) and (II)
in which
  $R^2$ and $R^3$ are identical and are methyl, ethyl, butyl, heptyl or phenylpropyl,
  $R^{12}$ to $R^{15}$ and $R^{69}$ to $R^{72}$ are hydrogen,
  $Z^1$ is a direct bond,
  $Z^2$ is —(CH$_2$)$_3$— or —(CH$_2$)$_4$—, and
  $X^-$ is a redox-inert anion or $I^-$—.

Very outstandingly suitable for the purposes of the invention are the electrochromic compounds of the formula (XXVI)
in which
  $E^5$ is NR$^{59}$,
  $R^{46}$ and $R^{59}$, independently of one another, are methyl, ethyl, propyl, butyl, phenylpropyl or phenyl,
  $R^{47}$, $R^{48}$, $R^{97}$ and $R^{98}$, independently of one another, are hydrogen, phenyl or phenoxy, and
  $R^{99}$ and $R^{100}$ are hydrogen.

Likewise very outstandingly suitable for the purposes of the invention are the electrochromic compounds of the formula (La)
in which
  $OX_2$ is a radical of the formula (I),
  $RED_1$ is a radical of the formula (XXVI), and
  B is —(CH$_2$)$_n$—, where
    n is an integer from 3 to 6,
  $R^2$ and $R^{46}$ are a direct bond to B,
  $R^3$, $R^{12}$ to $R^{15}$, $R^{69}$ to $R^{72}$, $Z^1$ and $X^-$ have the outstanding meaning given above, $R^{47}$, $R^{48}$, $R^{97}$ to $R^{100}$ are hydrogen or a maximum of 2 of the radicals $R^{47}$, $R^{48}$, $R^{97}$ and $R^{98}$ are phenoxy, $E^5$ is $NR^{59}$, and $R^{59}$ is methyl, ethyl, butyl, heptyl, phenylpropyl or phenyl.

Likewise very outstandingly suitable for the purposes of the invention are the electrochromic compounds of the formula (CLXa)

in which $OX_2$ is a radical of the formula (I), $RED_1$ is a radical of the formula (XXVI), D is the formula (CLXXI), E is the formula (CLXXII), $Y^{10}$ and $y^2$, independently of one another, are hydrogen or methyl, $Y^{11}$ is —COOCH$_2$CH$_2$CH$_2$CH$_3$, $Y^{13}$ is a bridge of the formulae —CO—O— or —C$_6$H$_4$— to $B^1$ or $B^2$, $B^1$ and $B^2$, independently of one another, are a bridge of the formulae —(CH$_2$)$_n$—, where n is an integer from 1 to 6, $R^2$ is a direct bond to $B^1$, $R^3$ and $R^{46}$ are a direct bond to $B^2$, $R^{12}$ to $R^{15}$, $R^{69}$ to $R^{72}$, $Z^1$ and $X^-$ have the outstanding meaning given above, $R^{47}$, $R^{48}$, $R^{97}$ to $R^{100}$ are hydrogen, or a maximum of 2 of the radicals $R^{47}$, $R^{48}$, $R^{97}$ and $R^{98}$ are phenoxy, $E^5$ is $NR^{59}$ and $R^{59}$ is methyl, ethyl, butyl, heptyl, phenylpropyl or phenyl.

The electrochromic filter according to the invention preferably comprises, in its electrochromic medium, at least one solvent in which the electrochromic substances, optionally a conductive salt and optionally further additives are dissolved. The solvent may also have been thickened to give a gel, for example by means of polyelectrolytes, porous solids or nanoparticles having a large active surface area.

If use is made of polymeric electrochromic compounds, in particular of the formulae (L) to (Ld) to (Lf) and (CL) and (CLa) to (CLc) and (CLX) and (CLXa) to (CLXb), the solvent can be omitted. It is also possible for such polymers to be mixed, for example formula (LXV) and (LXVII). Further $OX_2$ or $RED_1$ are optionally dissolved in the polymer, for example formula (XXVI) in polymer of the formula (LXV).

Suitable solvents are all solvents which are redox-inert under the selected voltages and which are not able to eliminate any electrophiles or nucleophiles or themselves react as sufficiently strong electrophiles or nucleophiles and so could react with the coloured free-radical ions. Examples are propylene carbonate, γ-butyrolactone, acetonitrile, propionitrile, benzonitrile, glutaronitrile, methylglutaronitrile, 3,3'-oxydipropionitrile, hydroxypropionitrile, dimethylformamide, N-methylpyrrolidone, sulpholane, 3-methylsulpholane or mixtures thereof. Preference is given to propylene carbonate, benzonitrile and mixtures with one another or with glutaronitrile or 3-methylsulpholane. Particular preference is given to propylene carbonate. Particular preference is likewise given to benzonitrile.

The electrochromic solution may contain at least one inert conductive salt. In particular if at least one of the substances of the redox pair $RED_1/OX_2$ is of an ionic nature, addition of a conductive salt is unnecessary.

Suitable inert conductive salts are lithium, sodium and tetraalkylammonium salts, in particular the latter. The alkyl groups may have between 1 and 18 carbon atoms, and be identical or different. Preference is given to tetrabutylammonium. The anions to these salts, but also the anions $X^-$ in the formulae (I) to (VI), (CI), (CII) and (CV) to (CVII) and in the metal salts are all redox-inert, colourless anions.

Examples are tetrafluoroborate, tetraphenylborate, cyanotriphenylborate, tetramethoxyborate, tetrapropoxyborate, tetraphenoxyborate, perchlorate, chloride, nitrate, sulphate, phosphate, methanesulphonate, ethanesulphonate, tetradecanesulphonate, pentadecanesulphonate, trifluoromethanesulphonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate, hexafluorosilicate, 7,8- or 7,9-dicarbanidoundecaborate(-1) or (-2), which are optionally substituted on the B and/or C atoms by one or two methyl, ethyl, butyl or phenyl groups, dodecahydro-dicarbadodecaborate(-2) or B-methyl-C-phenyl-dodecahydro-dicarbadodecaborate(-1).

Likewise suitable, including as anions $X^-$ in the formulae (I) to (VI), (CI), (CII) and (CV) to (CVII) and in the metal salts, are the abovementioned anions, which can also take on the role of an $RED_1$, for example $I^-$ and $I_3^-$.

The EC contrast plate according to the invention is operated using a direct current which is constant, pulsed or varying in amplitude, for example varying sinusoidally. The voltage depends on the desired colour depth, but in particular on the reduction and oxidation potentials of the $OX_2$ and $RED_1$ used. Such potentials are given, for example, in (S. H üinig, H. Berneth, Topics in Current Chemistry, Volume 92, pp. 1–44, 1980) or (K. Deuchert, S. Hüinig, Angew. Chem. 90, 927, 1978) or the literature cited therein. The difference of their potentials is a guide value for the requisite voltage, but the electrochromic device can also be operated at lower or higher voltage. In many cases, for example when use is made of $OX_2$=formula (I) or (V) and $RED_1$=formula (XX), (XXII), (XXVI) or (XXVII) or they are linked via a bridge of the formula (L), in particular formula (La) to (Lf), this potential difference necessary for operation is $\leq 1$ V.

If the voltage is switched off, the electrochrornic device according to the invention returns to its original state. This erasure can be considerably accelerated if the contacted segments or plates are short-circuited. Repeated reversal of the voltage, if necessary also with simultaneous reduction in the voltage, also allows the display to be erased very rapidly.

By variation of the layer thickness of the electrochromic device, the viscosity of the electrochromic solution and/or the diffusion or driftability of the electrochromic substances, the switch-on and switch-off times of the display device can be modified within broad limits. For example, thin layers exhibit shorter switching times than thick ones. It is therefore possible to construct rapidly and slowly switchable devices and thus to provide optimum matching to the particular applications.

In the case of slow devices, the coloration in the switched-on state can be maintained using a power-saving or refresh mode. After the coloration has been built up, for example by means of a direct voltage of sufficient magnitude which is constant or varying with high frequency or pulsed, the system is switched to pulsed or varying direct voltage of low frequency, where, during the phases in which the voltage is zero, the contacting of the conductive coating of the plates or films is not short-circuited. This low frequency can be, for example, in the region of 1 Hz or lower, where the duration of the switch-on and switch-off phases need not be of equal length, but instead, for example, the switch-off phases may be significantly longer. Since the colour depth only decreases slowly during the current pauses in the non-short-circuited state, relatively short current pulses are sufficient to compensate for these losses again in the subsequent refresh phase. This gives a flicker-free image with virtually constant colour depth, but whose maintenance requires only a fraction of the current which would arise in the case of permanent current flow.

The EC contrast plate can be coupled with any desired display devices which emit light. This applies to plasma displays, liquid-crystal displays, electroluminescent displays, vacuum fluorescent displays, light-emitting diodes and other types of display. It can also be used to attentuate the light from light sources, such as, for example, automobile headlamps, brake lights, rear lights or ceiling lamps.

The invention furthermore relates to an EC contrast plate having an integrated touch screen. The EC contrast plate is either constructed as a discrete unit in front of the display screen or the outer surface of the screen is used at least partly as substrate. The base area of the EC contrast plate is larger than the area of the screen. The part of the EC contrast plate that projects beyond the screen area serves as touch screen and contains firstly one or more touch sensors and secondly an EC based display unit. The sheet of the EC contrast plate facing the screen or connected to the screen is referred to below as the carrier plate, and the other as the outer plate. A radiation source is arranged at at least one of the faces of the transparent outer plate of the EC contrast plate; its light enters the outer plate and illuminates it. At least one photodetector is mounted at the carrier plate; some or all of the outer-plate area lies within its photosensitive solid-angle region so long as it projects beyond the base area of the screen.

The light propagates from the radiation source over the irradiated face of the outer plate by total reflection at the interfaces of the outer plate. When the outer-plate surface is touched with a finger, contact areas are formed between the plate and the uppermost skin layer, which comprises predominantly phosphorus lipids. The lipid layer has a refractive index in the range from 1.5 to 1.6. This value is in the region of the refractive index of a transparent plate or even above it, and consequently the majority of the light totally reflected without touching is no longer totally reflected at the touched point of the plate surface, but penetrates into the skin and is highly scattered in it. A pale area forms in the contact zone and is detected by the photodetector at the opposite carrier plate of the display device. The extent and brightness of this area varies as a function of the touch pressure. Evaluation electronics of suitable design allow the sensitivity of the touch sensor to be adjusted to a desired level.

The display part of the touch screen in the part of the EC contrast plate projecting beyond the screen can be designed as a reflective display without its own light source. In this case, the carrier plate, if it projects beyond the base area of the screen, preferably has a coating on its inside which predominantly reflects the visible light, while being predominantly transparent to light emitted by the radiation source at the outer plate. Alternatively, the reflective coating can contain a transparent area for the light of the radiation source illuminating the outer plate, preferably in the centre of the photosensitive solid-angle region of the photodetector. At least one of the electroconductive coatings is structured in the region of the part projecting beyond the screen area, enabling information to be displayed, whilst transmission of the EC contrast plate can be varied in this region independently of the part of the EC contrast plate lying in front of the screen area.

The display part of the touch screen can also be designed as a transmissive display having an additional light source for back-illumination of the part of the EC contrast plate projecting beyond the screen area.

The outer plate preferably has a thickness of at least 0.05 mm, particularly preferably at least 0.5 mm. It can consist of any material of low light attenuation in the spectral region of the radiation source. When assessing the light attenuation, the length which corresponds to the greatest dimension of the plate must be considered. Preference is given to a material in which the light from the radiation source is attenuated by not more than 50% at a point of the outer plate with maximum separation from the source. Preferred materials are silicate glasses, quartz glasses or transparent polymers, such as polycarbonates, polymethacrylates or polyesters.

In order to ensure good total reflection of the incident light in the outer plate, the outer plate is preferably made of a material having a particularly high refractive index, preferably glass having a refractive index of greater than 1.5, particularly preferably greater than 1.6.

Suitable radiation sources for illuminating the outer plate are, for example, tungsten lamps, light-emitting semiconductor diodes or semiconductor laser diodes. The region of spectral sensitivity of the photodetector must cover the emission spectrum of the radiation source. The maximum sensitivity of the photodetector and the maximum in the emission spectrum of the radiation source preferably coincide. Preferred photodetectors are semiconductor photodetectors. Particular preference is given to silicon photodiodes, silicon phototransistors and silicon or silicon/metal oxide charge-coupled devices.

In order to eliminate the influence of ambient light on the touch sensor and to avoid adversely affecting the colour setting of the EC contrast plate, the outer plate is preferably illuminated using a radiation source whose emission spectrum is outside the visible spectrum, for example in the infrared spectral region at a wavelength greater than 680 nm, preferably greater than 780 nm and particularly preferably greater than 850 nm. The radiation source preferably emits in a spectral region in which the absorption of the display device is low and does not change greatly even when the displayed information is switched over.

Each photodetector is preferably followed by a unit for processing the electrical signal.

An additional measure for avoiding errors caused, for example, by ambient light is the use of the lock-in method (P. Cielo, Optical Techniques for Industrial Inspection, Academic Press San Diego 1988, p. 128–130). The radiation output of the radiation source is changed periodically with time at a frequency $f_Q$. Of the electrical signals from the photodetector, only that part of the signal which likewise changes periodically with time and at approximately the same frequency as the radiation output of the radiation source is passed on in a subsequent electronic unit. The choice of the width of the accepted frequency band $\Delta f_P$ of the signal from the photodetector about the frequency $f_Q$ enables the separation of desired signals and interfering signals to be optimized. Preference is given to a relative width of the accepted frequency band $\Delta f_P/f_Q$ of less than 0.1; particular preference is given to a relative width $\Delta f_P/f_Q$ of less than 0.01.

The solid-angle range in which the radiation source emits should preferably be matched to the illuminated face of the plate in order to achieve the fullest possible introduction of the light from the radiation source into the plate.

In order to obtain particularly good reflections of the incident light at the faces of the plate, one or more of the faces may be coated with an optically reflective material. The face illuminated by the radiation source is excepted from the coating. Due to the reflective coating of the faces, the incident light is reflected particularly frequently within the plate, i.e. it is utilized efficiently, and the plate is illuminated more uniformly. Preferred coatings are optically reflective metals and metal alloys, such as gold, silver, copper, nickel, tin or aluminium. Preferred coating methods are physical vacuum deposition methods, such as vapour deposition, sputtering, Chemical Yapor Deposition (CVD) (David A. Glocker, Ismat Shah (Ed.) Handbook of Thin Film Process Technologie, Institute of Physics Publishing, Bristol and Philadelphia 1995). It is also possible to adhesively bond on commercially available metal-coated films.

The outer plate, if it projects beyond the screen, may be divided into a plurality of touch fields. Touch fields are areas of the display device to which is unambiguously assigned a photodetector in whose photosensitive solid-angle region only this certain area of the display device lies. When different touch fields are touched, different photodetectors record the scattered light generated by the touch. The signals from the individual photodetectors allow reconstruction of which touch fields were touched. The separation between two adjacent touch fields should not be smaller than the typical diameter of a human fingertip of about 1 cm in order to avoid incorrect messages. The touch fields can be marked on the plate in a manner evident to the toucher or shown by the display.

The touch sensor can also be switched off completely or in a time-limited manner. This is advantageous in order to avoid incorrect functioning of the touch sensor in the case of touches which do not serve the intended purpose of switching, such as, for example, during cleaning. Switchingff can be effected by, given a certain time sequence of touches of the sensor, the associated electrical signals from the photodetector(s) initiating switching off in the downstream unit for processing the electronic signals. Switching off can mean that no further signals are being processed. Switching off can be time limited or can be reversed by a further defined signal sequence.

For example, in an embodiment of the claimed device which comprises only one touch field, the particular time sequence of the one signal can consist in the touch field being touched precisely three times in succession within a certain time, for example 5 seconds. In an embodiment of the claimed device which comprises at least two touch fields, the particular time sequence of signals can consist, for example, in two certain touch fields being touched precisely twice in succession simultaneously and within a certain time, for example 5 seconds. This signal sequence is then further processed by the downstream electronic signal processing device so that, for example for I minute, no signal corresponding to touching of a touch field is passed on.

The EC contrast plate according to the invention is easy to manufacture since the filling of the EC cell with the EC medium is easy to carry out and is much less complex than, for example, a sputtering process. The contrast plate has excellent light stability and allows a large number of switching cycles.

The EC contrast plate with integrated touch screen has the advantage of forming a single front sheet without gaps and joints. This is easy to clean and offers a robust surface for use in areas which have a high degree of soiling or aggressive environmental conditions or in which high hygiene requirements are made (foods industry).

FIGURES AND EXAMPLES

Figure 1A:
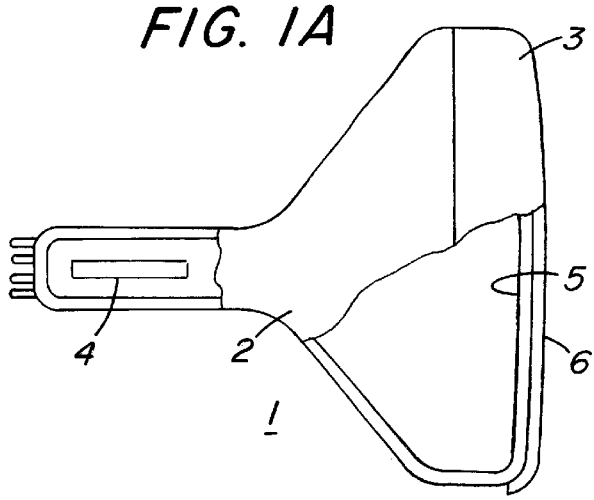
FIG. 1A shows a section through a CRT tube having an EC contrast plate which is connected to to the screen.

FIG. 1A shows a section through a CRT tube 1. The tube has a glass envelope 2 which encloses the screen 3. The electron gun 4 generates the electrons, which are focused and hit the phosphor-coated inner surface 5 of the screen 3. An electrochromic contrast plate 6 is mounted on the outer surface of the screen.

Figure 1B:
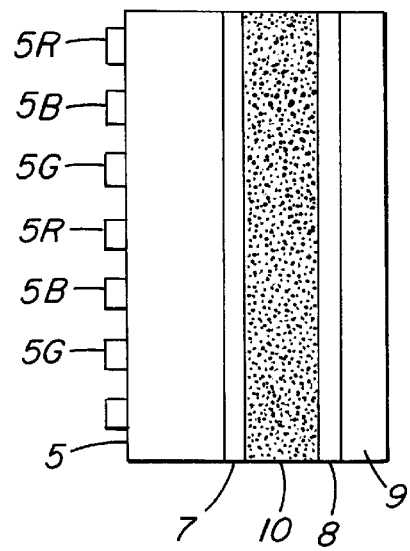
FIG. 1B shows a detail with layer sequence on the screen.

FIG. 1B shows a detail of the screen from FIG. 1A. The phosphor layer 5 consists of a regular pattern of phosphor spots with three different colours SR, SG, SB in the normal case for red, green and blue. An electrochroric contrast plate 6 is mounted on the outside of the screen 3. The contrast plate is connected to the screen 3 through a common sheet. The screen 3 has a transparent, electroconductive coating 7. The second electrode is formed by the second transparent, electroconductive coating 8, which is located on the transparent sheet 9. The electrochromic medium 10 is located between the two electrodes. The electrochromic medium 10 alters its transmission properties when an electric voltage is applied between the two electrodes 7 and 8.

Figure 2A:
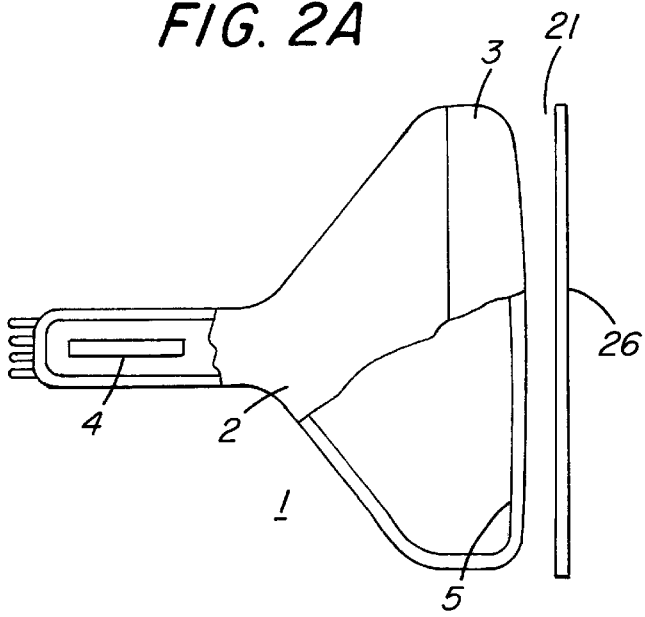
FIG. 2A shows a section through a CRT tube with EC contrast plate as a discrete unit in front of the screen.

In FIG. 2A, the electrochromic device 26 is positioned in front of the screen 3 with the interspace 21.

Figure 2B:
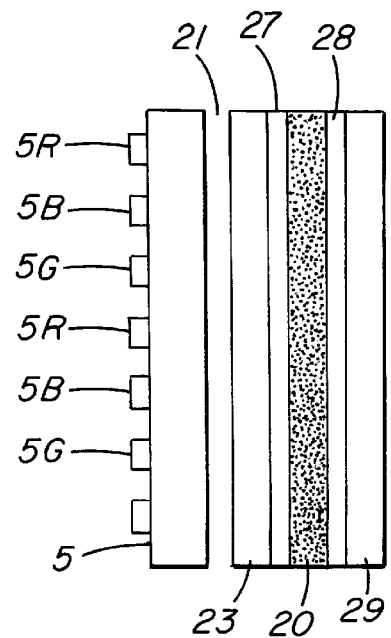
FIG. 2B shows a detail with layer sequence in front of the screen.

FIG. 2B shows a detail of the screen from FIG. 2A. The electrochromic contrast plate 26 consists of the transparent sheets 23 and 29 with the transparent, electroconductive electrodes 27 and 28, and the electrochromic medium 20. The space 21 between the screen 3 and the electrochrornic contrast plate 26 may be filled with a medium which matches the refractive index and thus reduces possible reflections.

Figure 3A:
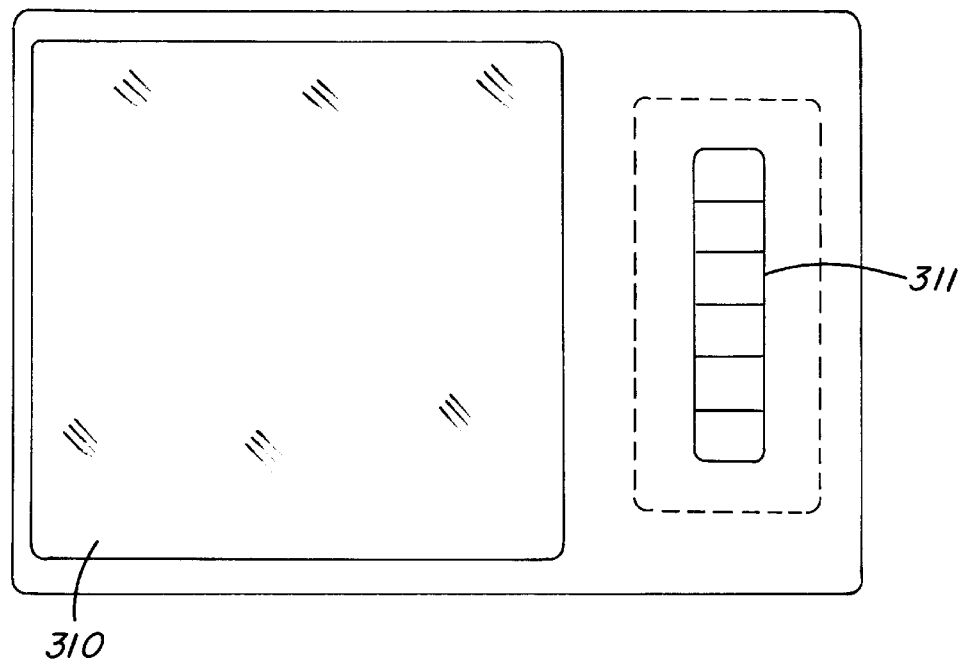
FIG. 3A shows a plan view of an EC contrast plate with integrated touch screen.
Figure 3B:
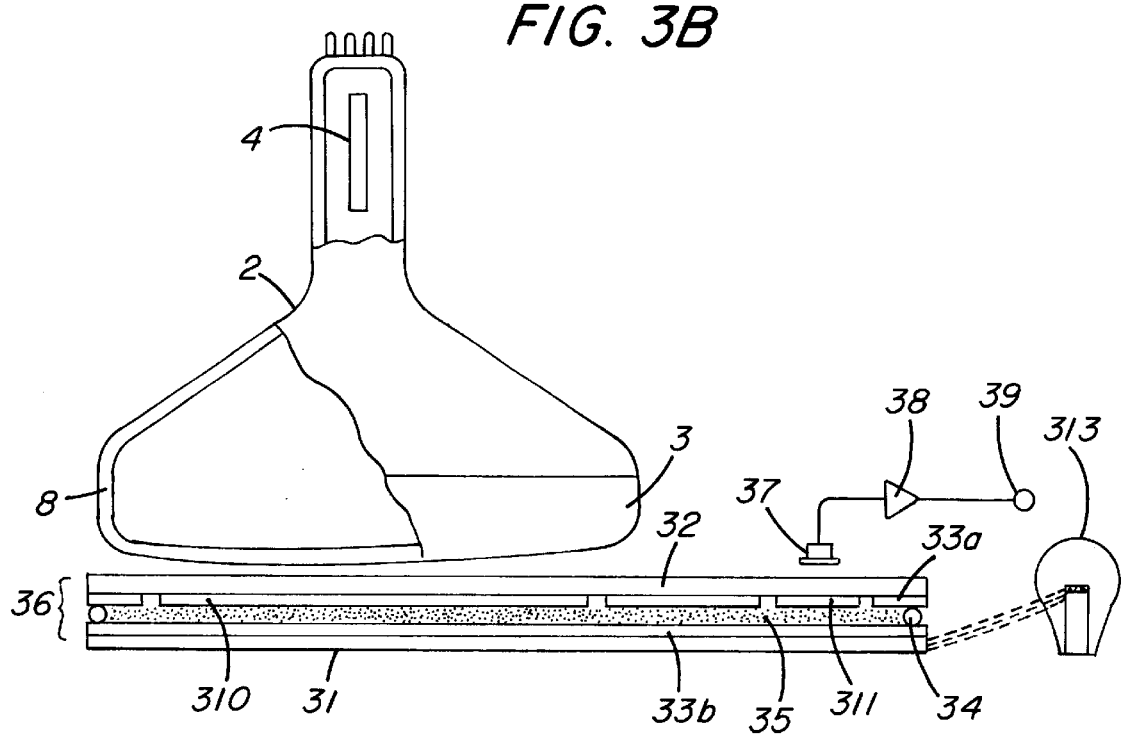
FIG. 3B shows a side view of an EC contrast plate with integrated touch screen.

FIGS. 3A and 3B show plan and side views respectively of an EC contrast plate 36 with integrated touch screen. The EC contrast plate is divided into an area having a contrast function 310 and an area with a function as touch screen 311. The EC contrast plate 36 is located in front of the screen 3 as a discrete unit. The base area of the EC contrast plate 36 is larger than the area of the screen 3. The part of the EC contrast plate which projects beyond the screen area serves as touch screen 311. The EC contrast plate 36 consists of a carrier plate 32 and an outer plate 31. An electroconductive, transparent coating 33a, which is divided into discrete areas 310 and 311 corresponding to the contrast function and the function as touch screen, is located on the carrier plate 32. The electroconductive, transparent coating 33b is located on the outer plate 31. The carrier plate 32 and the outer plate 31 are connected by a peripheral sealing ring 34 to form a cell, in which the electrochromic medium 35 is located. The outer plate 31 is illuminated at its face by the radiation source 313. A photodetector 37 is mounted at the carrier plate 32, with amplifier 38 and output contact 39.

What is claimed is:

1. An electrochromic contrast plate comprising:
   (a) a pair of transparent glass or plastic sheets that are each provided on one side with an electroconductive, transparent coating and that are joined together at the sides of their conductive coating via a sealing ring,
   (b) a volume formed by the pair of sheets and the sealing ring, and
   (c) an electrochromic medium that is a liquid, a gel or a polymer and that fills in the volume, which upon application of a voltage produces a uniform grey coloration in a C.I.E. triangle so that color coordinates (x,y) of dyes in the electrochromic medium are between 0.3 and 0.37 in the C.I.E. triangle.

2. The electrochromic contrast plate of claim 1, wherein the electrochromic medium comprises at least one pair of electrochromic and oxidizable or reducible substances $OX_2$ and $RED_1$.

3. The electrochromic contrast plate of claim 1, wherein the electrochromic medium comprises:
   a) a reducible substance that has at least one chemically reversible reduction wave in the cyclic voltammogram and an oxidizable substance that correspondingly has at least one chemically reversible oxidation wave, or
   b) a reducible substance and a oxidizable substance that are covalently bonded to one another via a bridge B, or
   c) a reducible substance or oxidizable substance, or both a reducible and an oxidizable substance selected from the group consisting of substances in which a reversible transition between the oxidizable form and the reducible form or vice versa is associated with the breaking or formation of a σ-bond, or
   d) a reducible substance, an oxidizable substance, or both a reducible substance and an oxidizable substance selected from the group consisting of metal salts and metal complexes of metals that exist in at least two oxidation states, or
   e) a reducible substance, an oxidizable substance, or both a reducible substance and an oxidizable substance selected from the group consisting of oligomers and polymers that contain at least one of said redox systems, or alternatively pairs of such redox systems, as defined under a) to d), or
   f) a reducible substance, an oxidizable substance, or both a reducible substance and an oxidizable substance selected from the group consisting of mixtures of the substances described in a) to e), provided that these mixtures comprise at least one reducible and at least one oxidizable redox system.

4. The electrochromic contrast plate of claim 1, wherein the electrochromic medium comprises electrochromic oligomers or polymers of the formulae

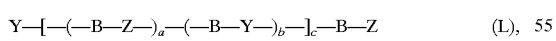  (L), in which
   Y and Z, independently of one another, are a radical $OX_2$ or $RED_1$, wherein
   $OX_2$ is the radical of a reversibly electrochemically reducible redox system, and
   $RED_1$ is the radical of a reversibly electrochemically oxidizable redox system,
   B is a bridging unit,
   c is an integer from 0 to 1000, and
   a and b, independently of one another, are an integer from 0 to 100, or $\ldots$—$(D)_r$ $\ldots$ —$(E—B^1—Y)_g$— $\ldots$ —$(F—B^2—Z)_h$ $\ldots$ (CL) and $\ldots$—$(D)_r$ $\ldots$ —$[E—(B^1—Y)_i—(B^2—Z)_j]_g$— $\ldots$ (CLX), in which
   D, E and F are components of an oligomer or polymer chain,
      wherein the units D, E and F may be either randomly distributed or arranged in blocks, $B_1$ and $B_2$ are a bridging unit, Y and Z, independently of one another, are a radical $OX_2$ or $RED_1$, wherein
      $OX_2$ is the radical of a reversibly electrochemically reducible redox system, and
      $RED_1$ is the radical of a reversibly electrochemically oxidizable redox system, each f, g and h, independently of one another, is an integer from 1 to 100,000, wherein
         f+g+h>2,
      each f and h, independently of one another, is optionally 0, and each i and j, independently of one another, is an integer from 1 to 100.

5. The electrochromic contrast plate of claim 1, wherein the electrochromic medium comprises electrochromic side-chain oligomers or polymers of the formulae $\ldots$—$(D)_r$ $\ldots$ —$(E—B^1—OX_2)_g$— $\ldots$ —$(F—B^2—RED_1)_h$—$\ldots$ (CLa), $\ldots$—$(D)_r$ $\ldots$ —$(E—B^1—OX_2)_g$— (CLb), $\ldots$—$(D)_r$ $\ldots$ —$(F—B^2—RED_1)_h$— $\ldots$ (CLc), $\ldots$—$(D)_r$ $\ldots$ —$(E—B^1—OX_2—B^2—RED_1)_g$— $\ldots$ (CLXa), or $\ldots$—$(D)_r$— $\ldots$ —$[F—B^2—RED_1—B^1—OX_2]_h$— $\ldots$ (CLXb)

in which
   f is an integer from 0 to 10,000,
   g and h, independently of one another, are an integer from 1 to 10,000, wherein $OX_2$ and/or $RED_1$, and wherein if g and/or h are >1, $OX_2$ and/or $RED_1$ can have different meanings in each recurring unit.

6. The electrochromic contrast plate of claim 5, wherein the electrochromic medium comprises electrochromic side-chain oligomers or polymers in which
   D represents the formula —$CHY^{10}$—$CHY^{11}$  (CLXXI) and E and F, independently of one another, represent the formula

—$CHY^{12}$—$CHY^{13}$—  (CLXXII), in which
      $Y^{10}$ and $y^{12}$ independently of one another, are hydrogen or $C_1$- to $C_4$-alkyl,
      $y^{11}$ is hydrogen, halogen, $C_1$- to $C_4$-alkyl, aryl or —COO—$C_1$- to $C_8$-alkyl, and
      $y^{13}$ is a direct bond or one of the bridges of the formula —O—, —CO—O—, —CO—NH— or —$C_6H_4$— to $B^1$ or $B^2$.

7. The electrochromic contrast plate of claim 1, wherein the transmission of the electrochromic layer in the visible region varies on variation of the strength of an applied voltage.

8. The electrochromic contrast plate of claim 1, wherein the minimum transmission of the electrochromic layer is less than 25%.

9. The electrochromic contrast plate of claim 1, wherein the maximum transmission of the electrochromic layer is greater than 70%.

10. The electrochromic contrast plate of claim 1, therein, upon application of a voltage to the conductive coatings, the electrochromic layer changes transmission in less than 5 minutes.

11. The electrochromic device of claim 1, wherein the contrast plate is connected to the screen via a common sheet.

12. An electrochromic contrast plate device comprising:
   (1) an integrated touch screen,
   (2) an electrochromic contrast plate device comprising
      (a) a pair of transparent glass or plastic sheets that are each provided on one side with an electroconductive, transparent coating and that are joined together at the sides of their conductive coating via a sealing ring, wherein one sheet faces the screen and is a carrier plate, and the other sheet is an other plate,
      (b) a volume formed by the pair of sheets and the sealing ring, and
      (c) an electrochromic medium that is a liquid, a gel or a polymer and that fills in the volume, which upon application of a voltage produces a uniform grey coloration in a C.I.E. triangle so that color coordinates (x,y) of dyes in the electrochromic medium are between 0.3 and 0.37 in the C.I.E. triangle,
   (d) a base, and
   (3) a radiation source,
wherein the base of the contrast plate has an area that is larger than the area of the screen, and the radiation source is arranged at least one face of the outer plate so that that light can enter and illuminate the outer plate, and at least one photodetector is mounted at the carrier plate, wherein some or all of the carrier plate lies within a photosensitive solid-angle region of a photodetector.

13. The electrochromic contrast plate of claim 12, wherein the electroconductive, transparent coating is structured by at least one of the sheets of the electrochromic contrast plate.

14. The electrochromic contrast plate of claim 12, wherein the carrier plate has a coating that predominantly reflects visible light, while it is predominantly transparent to the light emitted by the radiation source.

15. The electrochromic contrast plate of claim 12, wherein the carrier plate has a coating that has an area that is transparent to the light from the radiation source.

16. The electrochromic contrast plate of claim 12, wherein the outer plate has a thickness of at least 0.05 mm.

17. The electrochromic contrast plate of claim 12, wherein the outer plate has a refractive index of at least 1.5.

18. The electrochromic contrast plate of claim 12, wherein the radiation source has an emission maximum at a wavelength of greater than 680 nm.

19. The electrochromic contrast plate of claim 12, wherein at least one and a maximum of three faces of the outer plate are coated with an optically reflective material.

20. The electrochromic contrast plate of claim 12, wherein the optically reflective material is gold, silver, copper, nickel or aluminium, and the coating is produced by vapor deposition, sputtering, CVD or bonding on of metal-coated films.

21. The electrochromic contrast plate of claim 12, wherein a plurality of photodetectors are mounted at the carrier plate, and a region of the outer plate is located at a photosensitive solid-angle region of each photodetector.

22. The electrochromic contrast plate of claim 12, wherein each photodetector is followed by a unit for processing the electrical signal.

* * * * *